US008746577B2

(12) United States Patent
Bernhard et al.

(10) Patent No.: US 8,746,577 B2
(45) Date of Patent: Jun. 10, 2014

(54) PLACEMENT INSENSITIVE ANTENNA FOR RFID, SENSING, AND/OR COMMUNICATION SYSTEMS

(75) Inventors: Jennifer T Bernhard, Champaign, IL (US); Jessica E. Ruyle, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 110 days.

(21) Appl. No.: 13/200,191

(22) Filed: Sep. 20, 2011

(65) Prior Publication Data

US 2012/0074230 A1 Mar. 29, 2012

Related U.S. Application Data

(60) Provisional application No. 61/403,666, filed on Sep. 20, 2010.

(51) Int. Cl.
*G06K 19/06* (2006.01)
*H01Q 1/38* (2006.01)

(52) U.S. Cl.
USPC .................................... 235/492; 343/700 MS

(58) Field of Classification Search
USPC .................. 235/492; 343/702, 767, 700 MS; 340/572.7, 10.1
See application file for complete search history.

(56) References Cited

U.S. PATENT DOCUMENTS

| | | | | |
|---|---|---|---|---|
| 4,439,772 | A | 3/1984 | Van Kol | |
| 5,068,670 | A * | 11/1991 | Maoz | 343/767 |
| 6,075,493 | A | 6/2000 | Sugawara et al. | |
| 6,411,181 | B1 | 6/2002 | Ishikawa et al. | |
| 6,664,932 | B2 | 12/2003 | Sabet et al. | |
| 6,899,476 | B1 * | 5/2005 | Barrus et al. | 340/572.7 |
| 6,906,669 | B2 | 6/2005 | Sabet et al. | |
| 7,075,493 | B2 | 7/2006 | Azadegan et al. | |
| 7,262,740 | B2 | 8/2007 | Tikhov et al. | |
| 7,265,729 | B1 | 9/2007 | Chang et al. | |
| 7,268,741 | B2 | 9/2007 | Sarabandi et al. | |
| 7,330,152 | B2 | 2/2008 | Zhang et al. | |
| 7,714,794 | B2 | 5/2010 | Tavassoli Hozouri | |
| 7,828,221 | B2 | 11/2010 | Kwon | |
| 2004/0125029 | A1 * | 7/2004 | Maoz et al. | 343/702 |
| 2004/0160367 | A1 * | 8/2004 | Mendolia et al. | 343/700 MS |
| 2008/0129453 | A1 * | 6/2008 | Shanks et al. | 340/10.1 |
| 2010/0134291 | A1 * | 6/2010 | Lavedas | 340/572.7 |
| 2012/0217311 | A1 * | 8/2012 | Rokhsaz et al. | 235/492 |

OTHER PUBLICATIONS

Cohn, S.B. Slot Line on a Dielectric Substrate; IEEE Transactions on Microwave Theory and Techniques, vol. 17, No. 10, pp. 768-778. Oct. 1969.

Knorr, J.B. Slot-Line Transitions; IEEE Transactions on Microwave Theory and Techniques; vol. 22, No. 5, pp. 548-554. May 1974.

(Continued)

*Primary Examiner* — Thien T Mai
(74) *Attorney, Agent, or Firm* — Krieg DeVault, LLP

(57) ABSTRACT

An antenna includes a ground plane having a slot. The slot may be miniaturized using a meandered slot structure or other appropriate reactive loading method as an end load to one or both ends of the slot. An edge treatment may be included on one or more edges of the ground plane or a closely spaced reflecting plane. The antenna is structured to transmit or receive a signal independently or in response to electromagnetic radiation.

22 Claims, 29 Drawing Sheets

(56) References Cited

OTHER PUBLICATIONS

Shepherd, P.R. Analysis of Square-Spiral Inductors for Use in MMIC'S; IEEE Transactions on Microwave Theory and Techniques, vol. 34, No. 4, pp. 467-472. Apr. 1986.
Bryant, J.H. The First Century of Microwaves—1886 to 1986; IEEE Transactions on Microwave Theory and Techniques, vol. 36, No. 5, pp. 830-858. May 1988.
Himdi, M., Daniel, J.P. Analysis of Printed Linear Slot Antenna Using Lossy Transmission Line Model. Electronics Letters, vol. 28, No. 6, pp. 598-601. Feb. 3, 1992.
Azadegan, R. and Sarabandi, K. A Novel Approach for Miniaturization of Slot Antennas. IEEE Transactions on Antennas and Propagation, vol. 51, No. 3, pp. 421-429. Mar. 2003.
Qiu, M. and Eleftheriades, G.V. Highly Efficient Unidirectional Twin Arc-Slot Antennas on Electrically Thin Substrates; IEEE Transactions on Antennas and Propagation, vol. 52, No. 1, pp. 53-58. Jan. 2004.
Kim, J-M and Yook, J-G. A Parallel-Plate-Mode Suppressed Meander Slot Antenna With Plated-Through-Holes. IEEE Antennas and Wireless Propagation Letters, vol. 4, pp. 118-120, 2005.
Löcker, C., Vaupel, T., and Eibert, T.F. Radiation Efficient Unidirectional Low-Profile Slot Antenna Elements for X-Band Application; IEEE Transactions on Antennas and Propagation, vol. 53, No. 8; pp. 2765-2768. Aug. 2005.
Son, H.W.; Yeo, G.Y Choi; and Pyo, C.S. A Low-Cost, Wideband Antenna for Passive RFID Tags Mountable on Metallic Surfaces; IEEE Antennas Propag. Soc. Int. Symp., pp. 1019-1022. 2006.
Griffin, Joshua D., Durgin, Gregory D., Haldi, Andreas, Kippelen, Bernard, RF Tag Antenna Performance on Various Materials Using Radio Link Budgets. IEEE Antennas and Propagation Letters, vol. 5, pp. 247-250, 2006.
Prothro, J.T., Durgin, G.D. Durgin, and Griffin, J.D. The Effects of a Metal Ground Plane on RFID Tag Antennas. IEEE Antennas and Propagation Symposium 2006, Albuquerque, New Mexico, pp. 3241-3244. Jul. 2006.
Cho, C. Choo, H. and Park, I. Design of planar RFID tag antenna for metallic objects. Electronics Letters, vol. 44, No. 3, pp. 175-177. Jan. 31, 2008.
Ruyle, J. E. and Bernhard, J. T. Investigation of miniaturized and dual-band slot antennas for RFID systems. Proc. 2010 Antenna Applications Symposium, Allerton Park, Monticello, IL, Sep. 2010, pp. 441-454.
R. Simons and R. Arora, "Double-slot fin-line structure for millimeter wave applications", Proceedings of the IEEE, vol. 67, No. 8, p. 1159, 1979.
Ansys, "HFSS", Canonsburg, PA, vs. 12.
R. Simons, Studies on microwave slot-line and integrated fin-line. PhD thesis, Department of Electrical Engineering, Indian Institute of Technology, New Delhi, 1981.
J.E. Ruyle and J.T. Bernhard, "Investigation of edge serrations to eliminate cavity effect in parallel plate configurations," in Proc. USNC-URSI National Radio Science Meeting, Boulder, CO, Jan. 2010.
S.B. Cohn, "Slot line on a Dielectric Substrate," in IEEE Transactions on Microwave Theory and Techniques, vol. MTT-17, No. 10, Oct. 1969, p. 768.

* cited by examiner

PLACEMENT INSENSITIVE ANTENNA FOR RFID, SENSING, AND/OR COMMUNICATION SYSTEMS

CROSS-REFERENCE TO RELATED APPLICATIONS

This application claims the benefit of U.S. Provisional Patent Application No. 61/403,666, filed Sep. 20, 2010, and the same is incorporated herein by reference in its entirety.

GOVERNMENT RIGHTS

This invention was made under the United States Department of Energy's (DOE) National Nuclear Security Administration contract DE-AC04-94AL85000 and/or Sandia National Laboratories Grant/Contract No. DOE SNL 893 804, BANNER/UFAS No. 1-489191-933007-191100. The government has certain rights in the invention.

BACKGROUND

The present application is directed to RFID systems, and more particularly, but not exclusively, to an antenna for RFID systems.

Traditional radio-frequency identification ("RFID") systems with "peel-and-stick" labels are generally limited to tracking items with nearly electromagnetically transparent material properties. This limitation stems from the antenna choice for these labels—a dipole variant. Thus, generally, most RFID antennas are "dipole-like" meander lines, loops, or folded dipoles. These antennas perform poorly near ground planes or any material that is not electromagnetically transparent. While there are RFID antennas designed to be attached to metallic objects, these antennas are generally complicated, difficult to manufacture, and bulky compared to the traditional "peel-and-stick" antennas used in RFID.

Thus, there is an ongoing need for further contributions in this area of technology. The various inventive embodiments of the present application provide such contributions.

SUMMARY

One embodiment of the present application includes a unique antenna for a RFID system. Other embodiments include unique apparatus, devices, systems, and methods relating to wireless communication. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein:

FIG. 1(*b*) is a schematic view of a line model of a loaded slot antenna.

FIG. 5(*b*) is a side schematic view of the setup shown in FIG. 5(*a*).

FIG. 6(*b*) is a schematic view of an even mode field in a coupled slot configuration.

FIG. 8(*b*) is a far-away schematic view of the simulation setup shown in FIG. 8(*a*).

FIG. 9(*b*) is a graph showing a comparison of transmission line model versus HFSS® for slotline inductor impedance at UHF band from a lumped port position in an HFSS® simulation.

FIG. 11(*b*) is a zoomed-in view of the graph shown in FIG. 11(*a*).

FIG. 12(*b*) is a side schematic view of a miniaturized slot antenna shown in FIG. 12(*a*).

FIG. 12(*c*) is an isometric schematic view of a miniaturized slot antenna shown in FIG. 12(*a*).

FIG. 16(*b*) is an example of a corrugated edge treatment.

FIG. 16(*c*) is an example of a tapered edge treatment.

FIG. 16(*d*) is an example of a gingerbread edge treatment.

DETAILED DESCRIPTION OF REPRESENTATIVE EMBODIMENTS

Figure 1A:
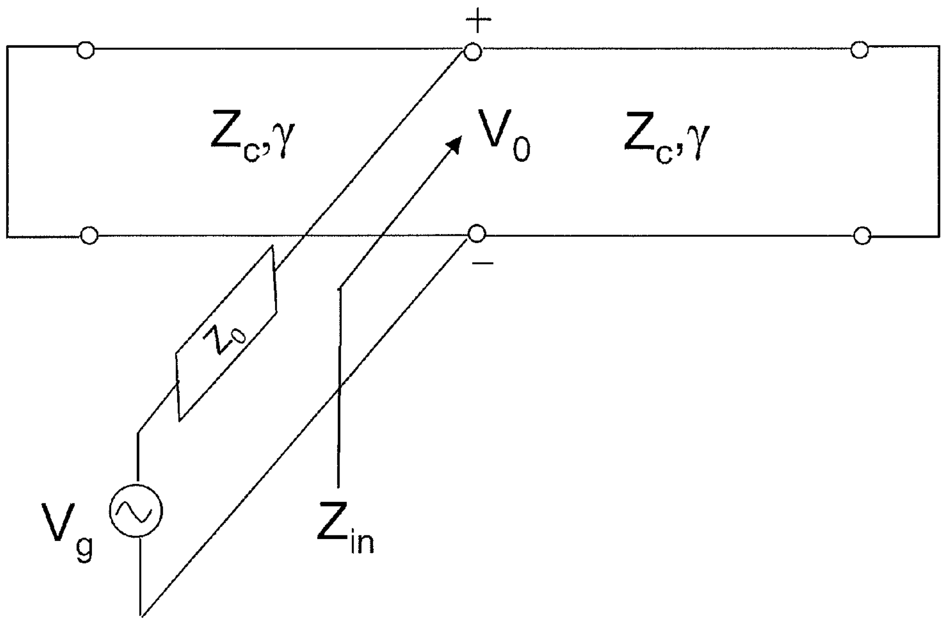
Fig. 1(a) (PRIOR ART)
FIG. 1(*a*) is a schematic view of a line model of a traditional slot antenna.

While embodiments of the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments and any further applications of the principles of the invention as described herein are contemplated as would normally occur to one skilled in the art to which the invention relates.

In one embodiment, a slot antenna, which is effectively the inverse of a dipole, is presented as an option for "peel-and-stick" RFID systems for non-electromagnetically transparent objects. Dual or multi-band operation is possible with the antenna structure such that a final design will provide a flexible sensing option in a range of application areas. Moreover, the impedance may be tuned based on the design of the antenna. The present application describes a design model that can be used to enable both single and dual-band behavior. The present application further describes the miniaturization method chosen for the antenna design, loading the slot antenna. This miniaturization method also provides for multi-band operation. The present application also describes a transmission line model of a slotline inductor—a convenient loading method for a slot antenna. Furthermore, to enable both single and dual-band behavior, the transmission line model is compared to simulated and measured results.

In another embodiment, the slot of an antenna may be reduced in size, such as to approximately one-tenth of a wavelength long, by spiraling the slot at both ends of the antenna. It is contemplated that any meandered slot structure presenting the appropriate loading condition may be used. In one embodiment, wavelength refers to the wavelength of electromagnetic field that the antenna is designed to radiate/receive. A metal reflecting plane is placed underneath the slot antenna with a relatively small electrical and/or physical spacing between the two conducting layers to make it placement insensitive when combined with an edge treatment on the ground plane.

In one example, the height of the substrate in between the ground plane and reflecting plane is approximately 0.002 wavelengths. The radiation from the slot can become trapped in the substrate in between the ground plane and reflecting plane. To release this trapped radiation, an edge treatment such as serrations are added to the edge of the ground plane. It is contemplated that the edge treatment can be parallel or perpendicular to the slot when the reflecting and ground planes are rectangular or in a radial configuration when the ground and reflecting plane are circular. In addition, the antenna can be designed to work at multiple frequencies because slotline inductors will load the antenna appropriately at multiple frequencies.

A traditional straight half-wavelength slot antenna generally would be too large for an RFID antenna at commonly used RFID frequencies. Loading the slot antenna to reduce its size was investigated. The investigation began with a transmission line model of the antenna.

Figure 1B:
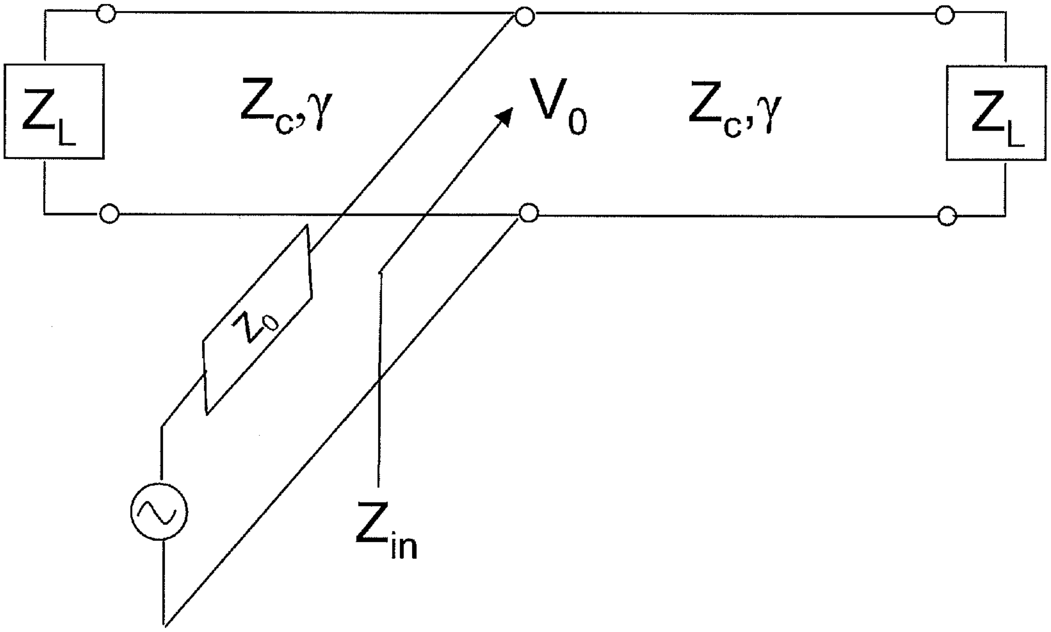
Fig.1(b) (PRIOR ART)

FIG. 1(*a*) is a schematic view of a line model of a traditional slot antenna. FIG. 1(*b*) is a schematic view of a line model of a loaded slot antenna. Referring generally to FIGS. 1(*a*) and 1(*b*), the transmission line model for a slot antenna equates the power delivered to a lossy transmission line and the power radiated by a slot. The model assumes that the slot antenna can be represented by two shorted lossy transmission lines in parallel, as shown in FIG. 1(*a*). Using the field requirements from transmission line theory, the far-field expressions for the radiated electric field are determined analytically. From these, the total power radiated is found in terms of the radiated loss per-unit-length ($\alpha$). $\alpha$ is found by equating the power delivered to the slot and the power radiated by the slot.

This same method can be employed with loads at the end of the slot instead of shorts as seen in FIG. 1(*b*). By loading the slot, the total size of the slot can be greatly reduced. If the slot antenna is correctly loaded for a particular frequency, the input impedance seen at the feedpoint is the same for the full-sized or loaded slot. End-loading for slot antennas may be effective. If an effective length of less than a half-wavelength is desired for the slot, the loads should be inductive. A slotline inductor provides a relatively easily integratable inductance for the slot antenna and can be used for the present antenna design. A transmission line model of the slotline inductor was pursued to aid in the design process of the inductor-loaded slot antenna.

Figure 2:
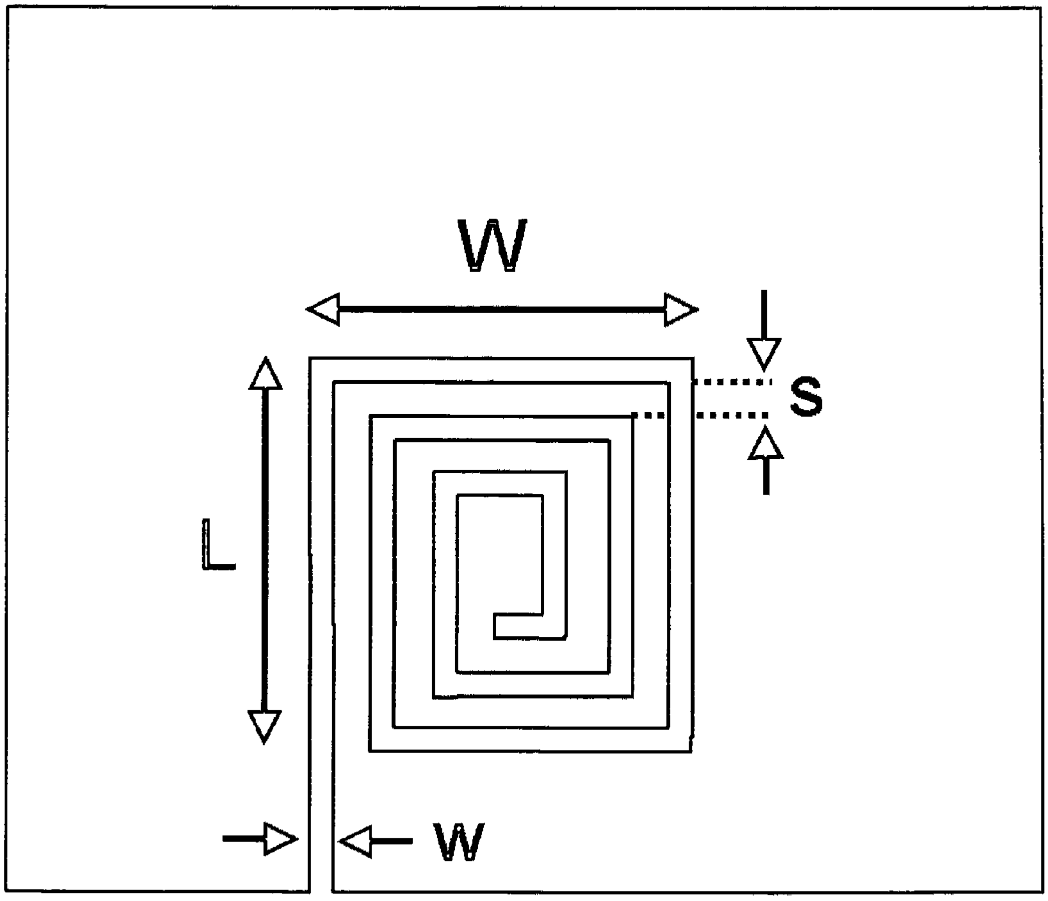
FIG. 2 is a schematic view of a slotline inductor with dimensions labeled.

A depiction of a three-turn slotline inductor 20 is shown in FIG. 2 with dimensions. As can be seen in the figure, the planar inductor is a set of four connected multi-conductor transmission lines. Since multi-line transmission line characteristics are time consuming and difficult to compute, one model seeks to use the characteristics of two-line coupled lines to approximate the multi-line transmission line.

Figure 3:
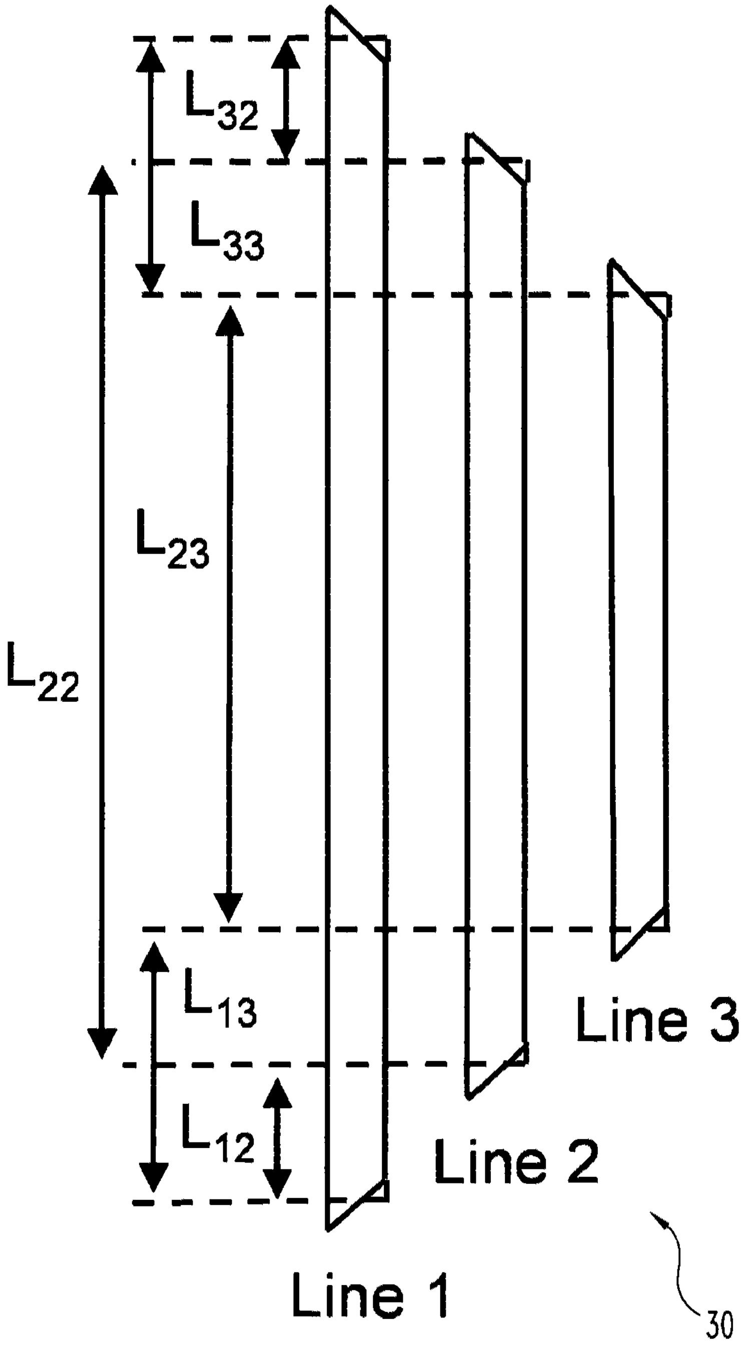
FIG. 3 is a schematic view of one section of the slotline inductor shown in FIG. 2.

The multiline transmission line is deconstructed into parallel singly coupled transmission lines. One side of the 3-turn inductor 20 is depicted in FIG. 3. FIG. 3 shows how the coupling lengths for a section of line are calculated. In FIG. 3, the coupling lengths for Line 1 coupling to Lines 2 and 3 are shown. The sections of the lines are denoted by $L_{xy}$. The "x" component denotes the section to which the primary line belongs. The "y" component denotes to which secondary line the primary line is coupling. In the square spiral inductor a length of line can be broken up into three sections. In the first section, the line is in isolation. In the second section, the line couples to the neighboring line. In the third section, the line is again in isolation. In the model the coupling length is an average of the two lengths of line. The difference between the coupling length and the actual physical lengths is halved and is used as the length of the line in sections one and three. If the section of line under consideration is an inner line and the coupling configuration under analysis is to a line further out in the inductor, the entire length of line is considered to be coupling to the outer line.

Figure 4:
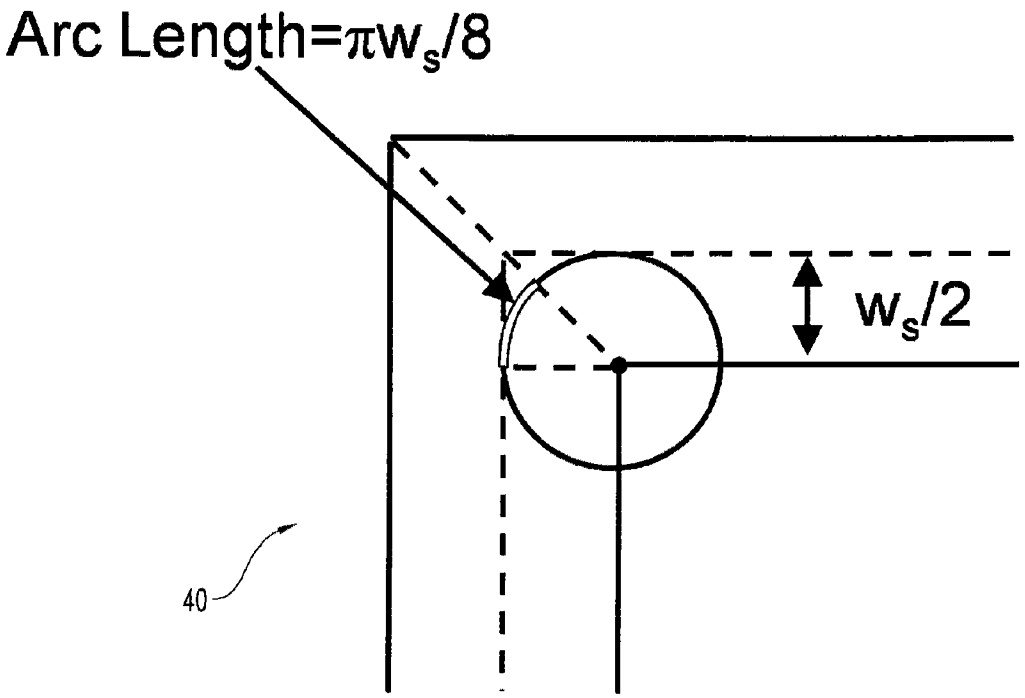
FIG. 4 is a schematic view of a corner of the slotline inductor depicting the assumption of field curving at corners.

Current curving has been noticed in corners of transmission lines. In one model, it was assumed that there was no current curving and merely used the midpoint of the diagonal line showing the intersection between sides of the inductor. It was assumed here, and this effect was noticed in images of fields in HFSS®, that the current curving phenomena occurred with electric fields in slot-line. The image in FIG. 4 depicts the effective length for the corner of a slot transmission line is calculated. This effective length is used in the calculation of lengths shown in FIG. 4. The length calculated is the same as is often used in microstrip. As can be seen in FIG. 4, a circle with a radius (r) that is half of the slot width ($w_s$) is placed with a center-point at the lower right of a corner. The arc (shown in hollow), which is one-quarter of the total circumference of the circle, is the effective length of one-half of a corner in the slot-line inductor.

Using the lengths defined above, the method for assembling the transmission line model of the slotline inductor is as follows. First, an ABCD matrix (also known as a transmission matrix) is calculated for each pair of coupled lines in isolation. In the case of the three-turn inductor, this would entail an ABCD matrix for the coupling configuration between Line 1 and Line 2 and another for the configuration between Line 1 and Line 3. These ABCD matrices are the result of multiplying three ABCD matrices together for each section of the line (as discussed earlier) where section 2 is the coupled line configuration and sections 1 and 3 are the line in isolation. Once the cascaded ABCD matrices are calculated, each of these matrices are converted to a Y-matrix. The Y-matrices are then added together to create a parallel configuration Y-matrix, describing the multi-line transmission line. This Y-matrix is then converted to an ABCD matrix. This process is repeated for every length of line in the inductor. Then, all of the ABCD matrices for every length of line are multiplied together in the proper order to obtain a total ABCD matrix describing the inductor.

To perform the calculations described above, the even and odd mode characteristic impedance and effective wavelengths must be known. The calculations are based upon a method which finds characteristic impedance and effective wavelength for a single slot.

Figure 5A:
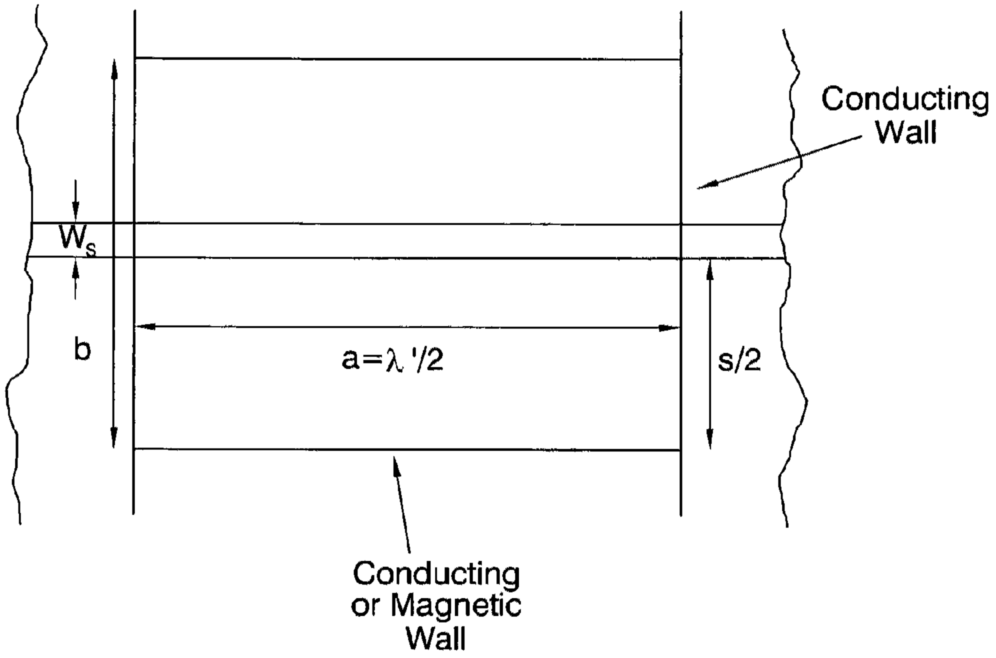
FIG. 5(*a*) is a top schematic view of a setup configured to analyze a slotline inductor.
Figure 5B:
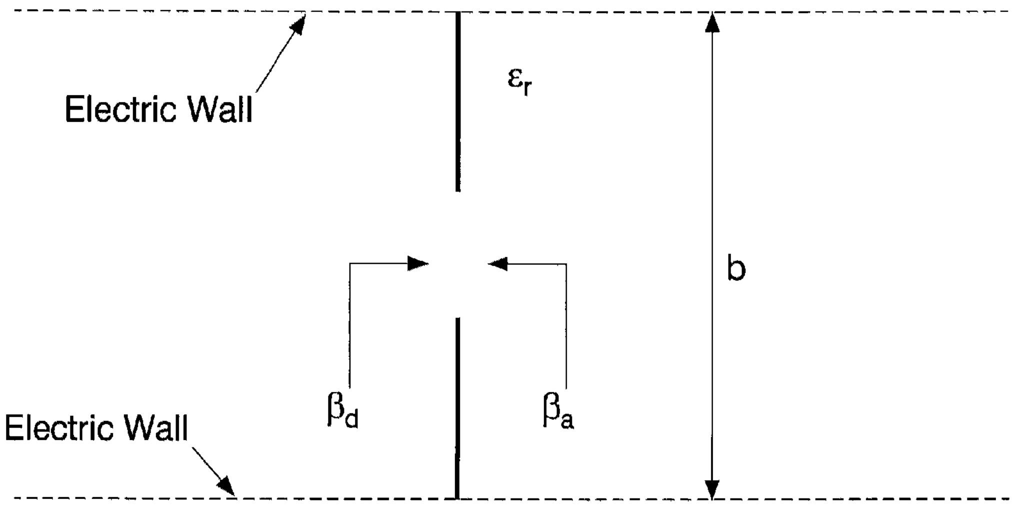

Two images depicting the setup for a method are shown in FIGS. 5(*a*) and 5(*b*). In essence, electric (or magnetic) walls are placed through and around the slot to create a waveguide structure with the slotline as a capacitive iris in the waveguide. The susceptance for both electric and magnetic walls is derived and the solutions converge. The walls perpendicular to the slot are placed a half-wavelength apart which is the location of field nulls; therefore, they do not disturb the fields of the slot. The walls parallel to the slot are placed symmetrically far enough apart from the slot to not affect the slot fields. This distance was found to be approximately one wavelength. The susceptance formula is in terms of a, which is defined in the figure as the separation between the wall perpendicular to the slot. The total susceptance at the slot is derived as a sum of the susceptance looking into the dielectric $\beta_d$ and looking into the air $\beta_a$. When the susceptance that one derives for the capacitive iris is equal to zero, the slot is resonant according to the transverse resonance method. When the slot is resonant, a is equal to the half of the effective wavelength. The value was determined through an optimization routine in Matlab minimizing the value of the susceptance at the slot. An expression for the characteristic impedance is also derived based upon an iterative procedure using the susceptance formula for the slot.

Figure 6A:
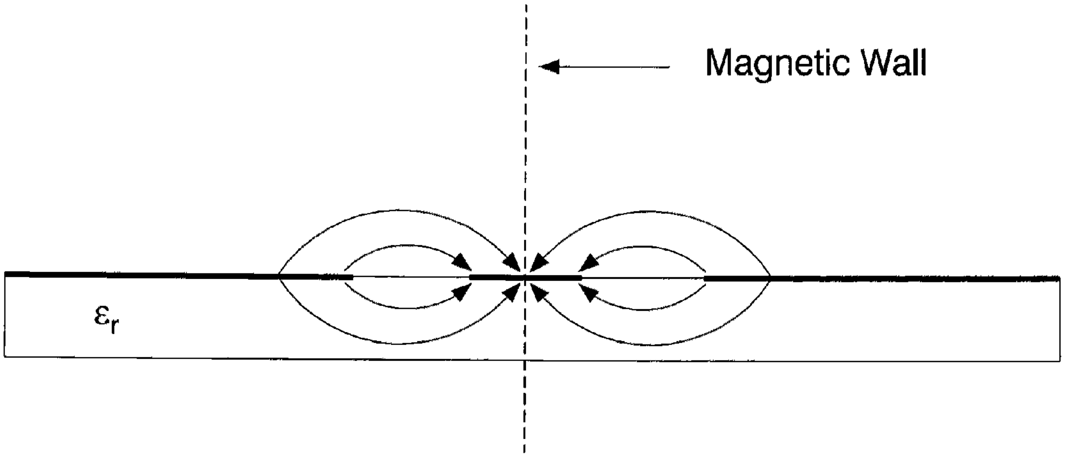
FIG. 6(*a*) is a schematic view of an odd mode field in a coupled slot configuration.
Figure 6B:
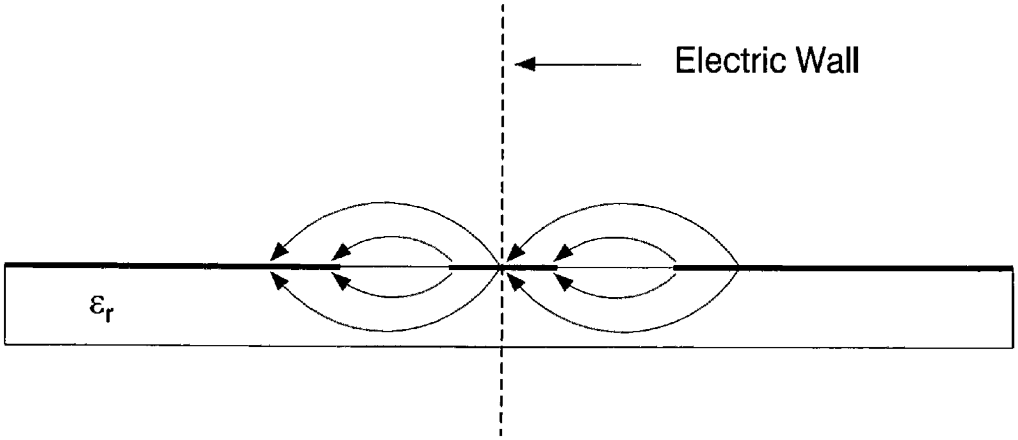

The fields for odd (a) and even (b) modes on the coupled slot are shown in FIGS. 6(*a*) and 6(*b*). For the odd mode, a magnetic wall can be placed halfway between the two slots. This is the mode in which coplanar waveguide operates. For the even mode, an electric wall can be placed halfway between the two slots.

Figure 7:
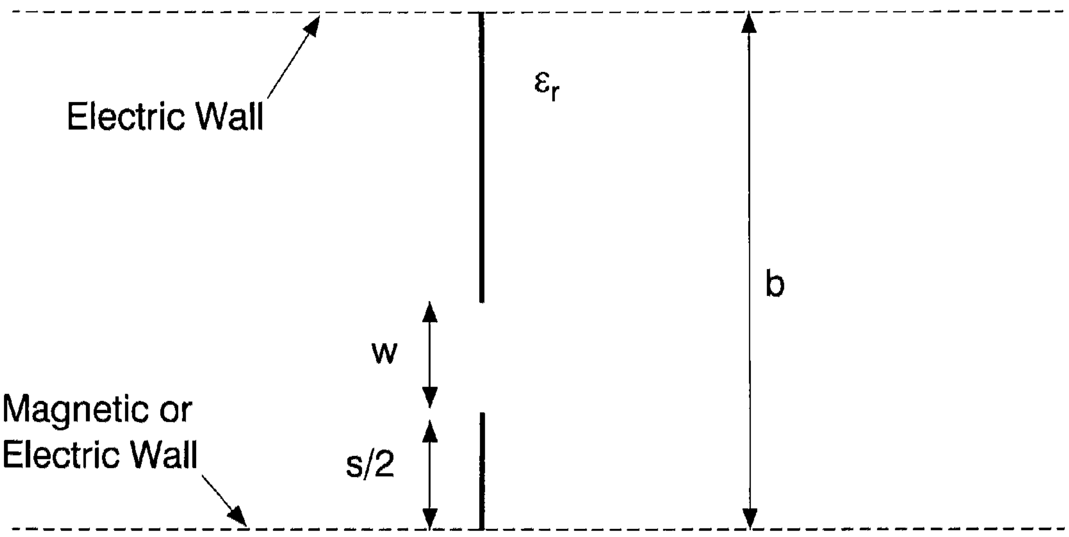
FIG. 7 is a schematic view of a setup configured to analyze the coupled slotline.

An earlier configuration is altered to derive the characteristic impedance and effective wavelength of the even and odd modes of coupled slotline as shown in FIG. 7. The setup of the walls parallel to the slotline was changed to be asymmetric. Instead of being sufficiently far away to not disturb the fields, one wall is set to be half of the distance (s) of the separation between the coupled slots. For the odd mode, the susceptance of the slot is derived assuming the wall between the slots is magnetic. For the even mode, the wall is set to be electric. The expressions derived for effective wavelength and characteristic impedance can be used with the susceptance derived to find the even and odd mode characteristic impedance and effective wavelength. Setting up the problem in this manner allows one to find the characteristic impedance and effective wavelength for a purely even or odd mode.

For the transmission line model of the slotline inductor, if the total length of the inductor (stretched out) is less than a quarter wavelength long, it is assumed that only the even mode exists. If the inductor length is between a quarter and a half wavelength, the odd mode is stepped in with frequency linearly such that by the time the inductor is a half wavelength long, the assumed effective wavelength is the arithmetic average of the even and odd modes and the characteristic impedance is the geometric mean of the even and odd mode characteristic impedance.

A transmission line model for the slotline inductor was developed using the methods outlined above. The results of this model are compared with simulated (HFSS®) and measured results.

Figure 8A:
FIG. 8(*a*) is a close-up schematic view of a simulation setup for the slotline inductor in HFSS.
Figure 8B:
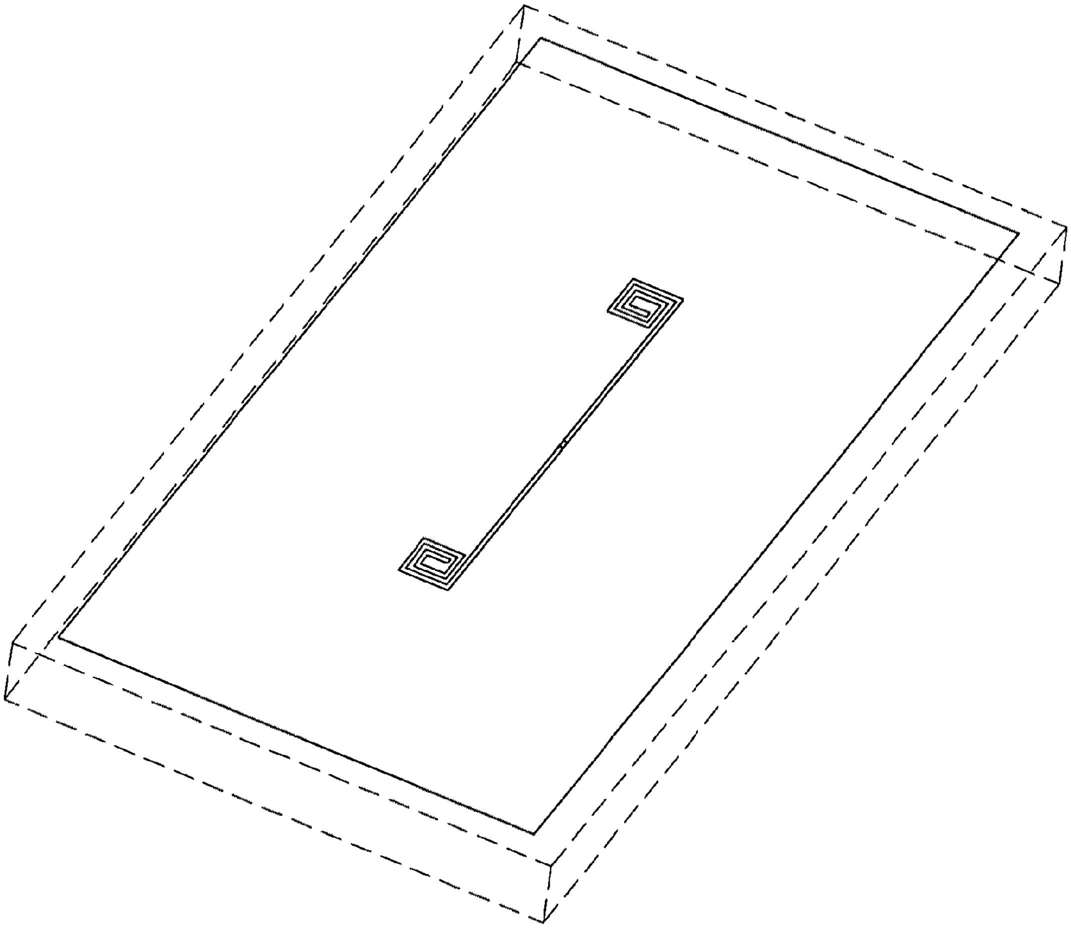

The setup for the simulation of the slotline inductor in HFSS® is shown in FIGS. 8(*a*) and 8(*b*). Two slotline inductors are excited in parallel with a lumped port. The impedance of a single slotline inductor is found by multiplying the impedance at the lumped port by two and then de-embedding using transmission line equations to the input port of the slotline inductor.

Figure 9A:
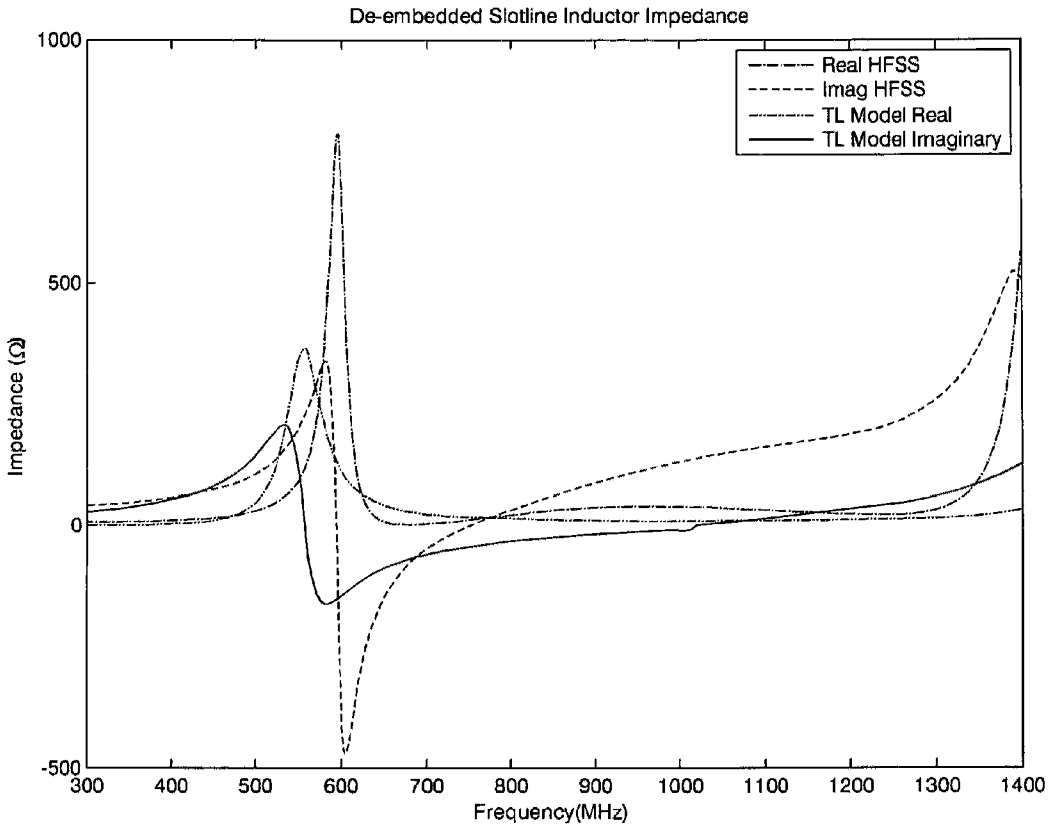
FIG. 9(*a*) is a graph showing a comparison of transmission line model versus HFSS® for slotline inductor impedance at UHF band de-embedded to the input port of a slotline inductor.
Figure 9B:
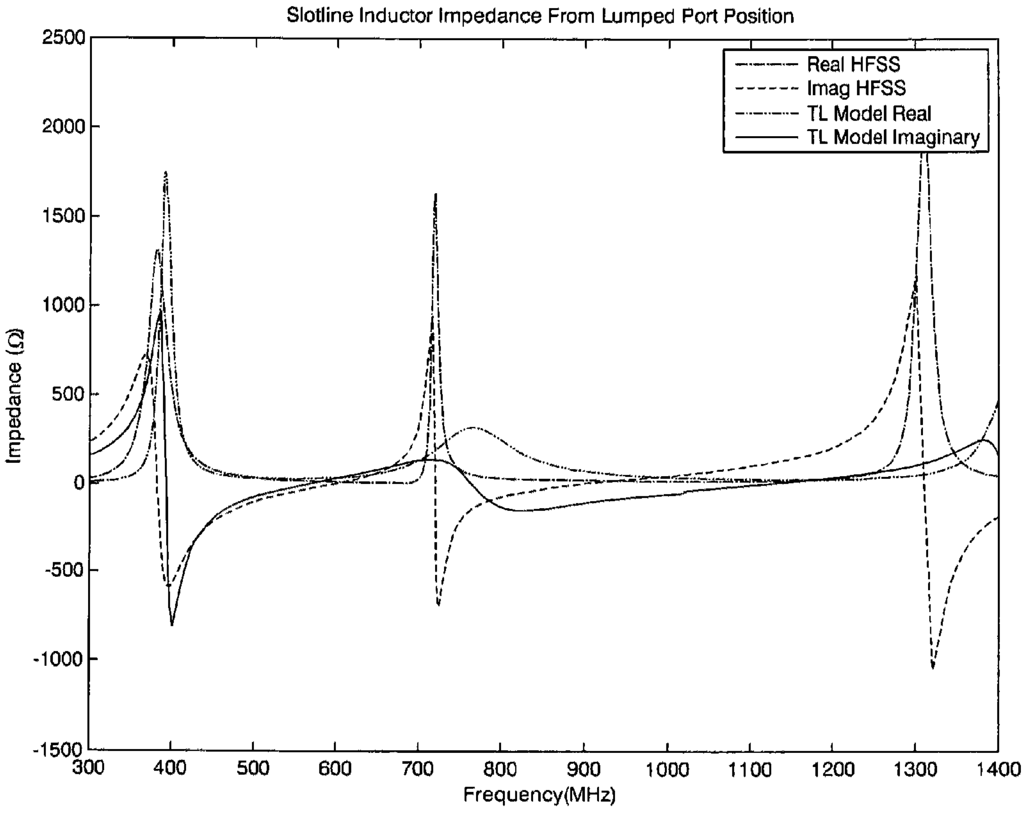

The results of the transmission line model of the slotline inductor compared with the HFSS® simulation in the UHF band are shown in FIGS. 9(*a*) and 9(*b*). The dimensions of the inductor under consideration are: L=15 mm, W=15 mm, $w_s$=1 mm, h=1.524 mm, $\in_r$=2.94, $L_{ext}$=107.5 mm. The dimensions not defined above are: h (height of substrate), $\in_r$ (relative dielectric constant of substrate), and $L_{ext}$ (length of transmission line to lumped port in simulation). A comparison with the HFSS® results de-embedded to the input port of the slotline inductor are shown in FIG. 9(*a*). A comparison with the results from the HFSS® simulation not de-embedded and the transmission line model extended by the necessary length of transmission line is shown in FIG. 9(*b*). As can be seen in both figures, the model works well up to around 650 MHz. After this frequency, corner effects that are not taken into account in the model become important and the simulation results and transmission line model do not as match well.

Figure 10:
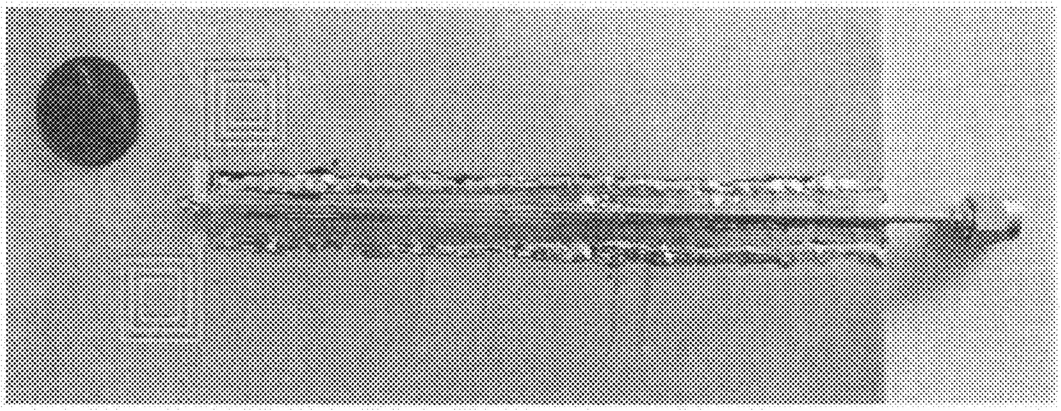
FIG. 10 is a picture of a constructed and measured slot antenna.

As one example, a slot antenna was constructed with slotline inductors loading both ends. A picture of the exemplary constructed antenna is shown in FIG. 10. A penny is placed next to the antenna to show size. The ground plane is larger than what is shown; the picture is zoomed in to show detail. The ground plane is 30 mm by 20 mm. The dimensions of the slotline inductor are identical to the dimensions discussed earlier except for the transmission line extension: L=15 mm, W=15 mm, $w_s$=1 mm, h=1.524 mm, $\in_r$=2.94, $L_{ext}$=2 mm. The slot that is fed connecting the two slotline inductors has dimensions, $w_a$=3 mm (width of slot), $L_a$=15 mm (length of slot). The slot is fed at the center.

Figure 11A:
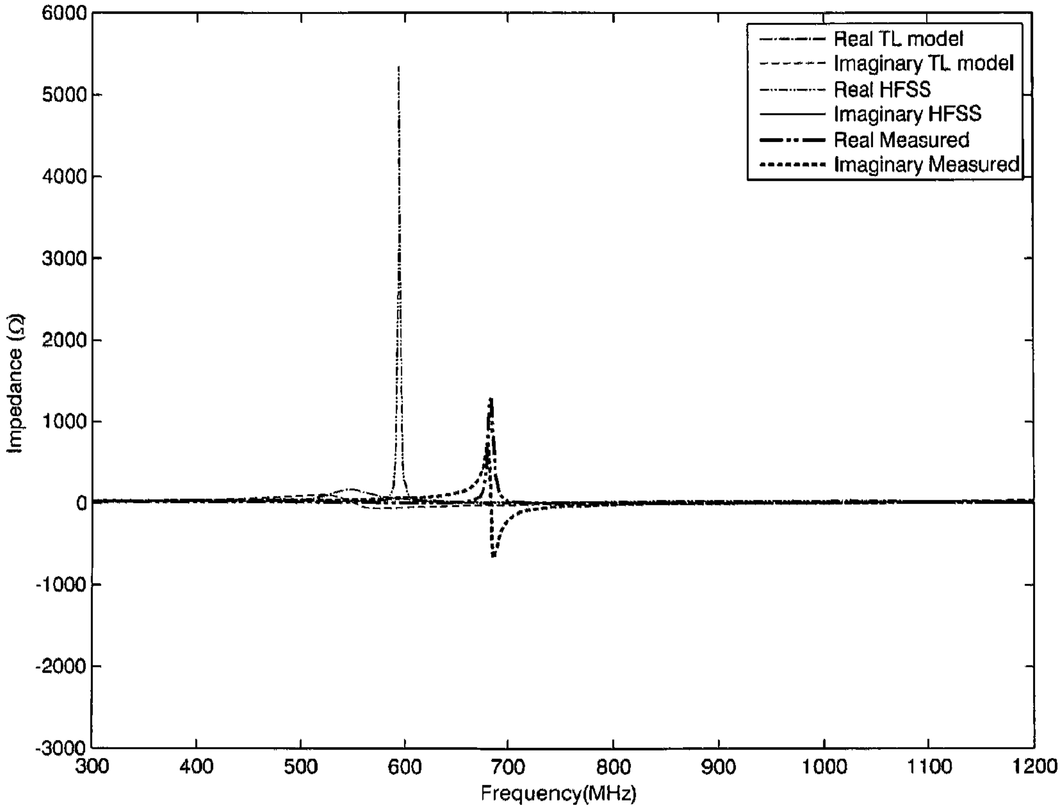
FIG. 11(*a*) is a zoomed-out graph showing a comparison of input impedances found using transmission line model, HFSS®, and measured results.
Figure 11B:
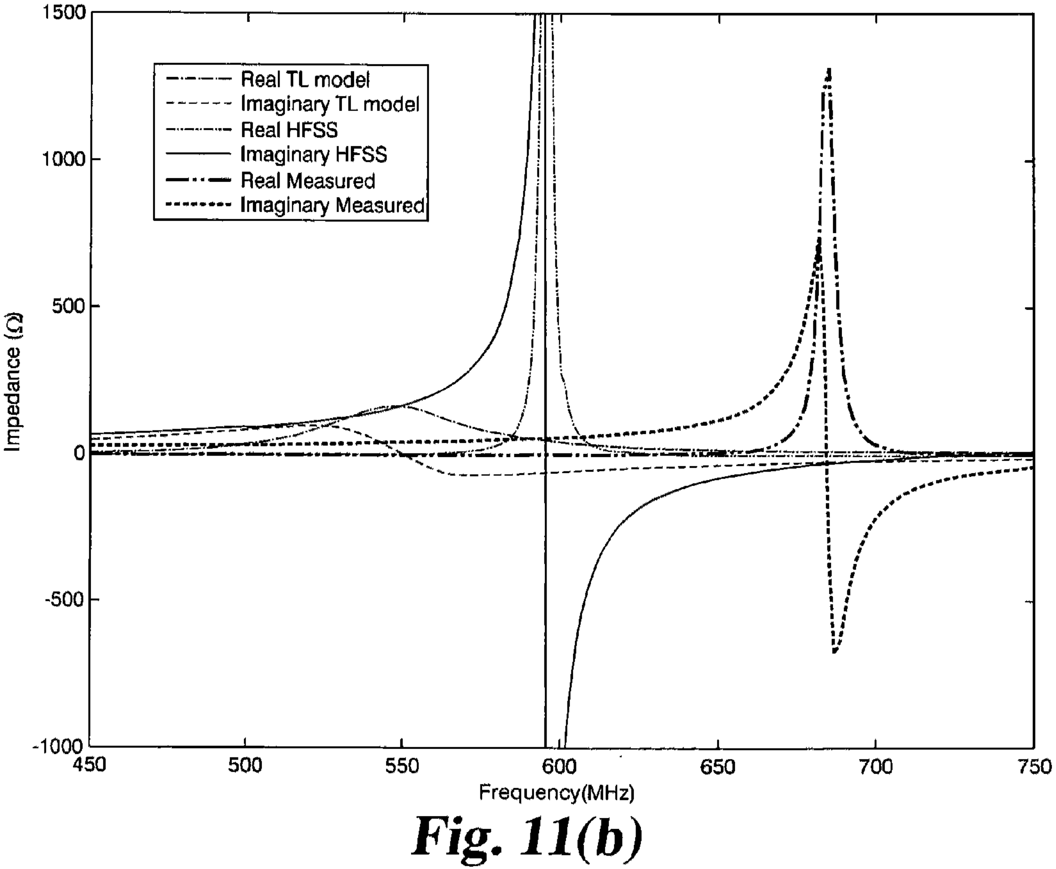

The measured results were compared to the transmission line model and the HFSS® simulation. This comparison is shown in FIGS. 11(*a*) and 11(*b*). As can be seen in the figure, both the transmission line model and the HFSS simulation predict a lower frequency response than what is measured. This was thought to be due to the fact that the impedance of the coaxial probe is neglected. However, a model for the coaxial probe was included in the extraction and the frequency of the measured results was still approximately 100 MHz higher than the simulated results. Also, the response of the transmission line model is relatively much smaller in magnitude than either the simulation or measured results. This is due to the fact that the transmission line model calculates the attenuation constant for the slotline assuming the line is straight. Since the line is not straight but in fact coiled in the inductor, this assumption overestimates the attenuation constant.

A reflecting plane can be added to the design of the miniaturized slot antenna. Slot antennas with reflectors (second ground plane) often couple energy into a parallel plate mode between the ground plane and the reflecting plane. The parallel plate becomes a cavity with the walls appearing as reactive loads to the slot antenna. Instead of attempting to reduce this mode, edge treatments could be used to help this mode escape the substrate. As one example, edge serrations can reduce the cavity effect in a parallel plate configuration.

Figure 12A:
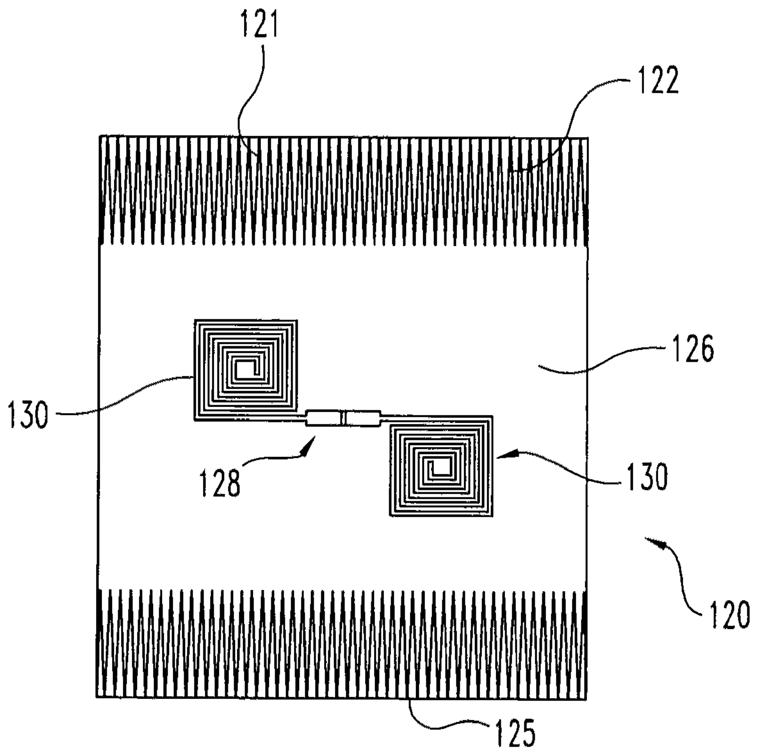
FIG. 12(*a*) is a top schematic view of a miniaturized slot antenna with edge serrations and reflecting plane.
Figure 12B:
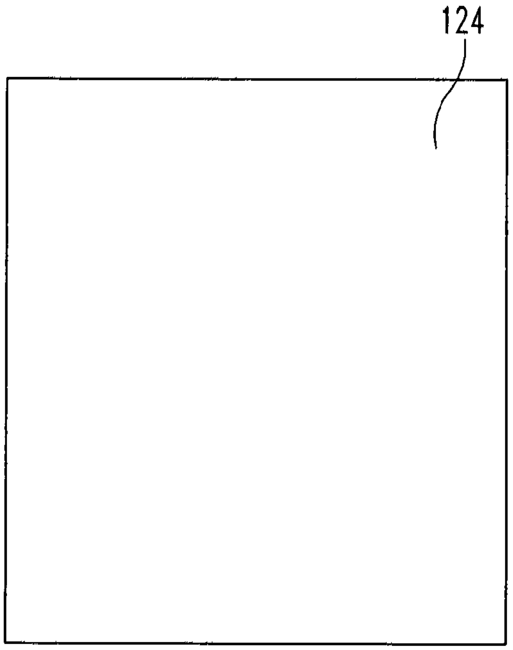
Figure 12C:
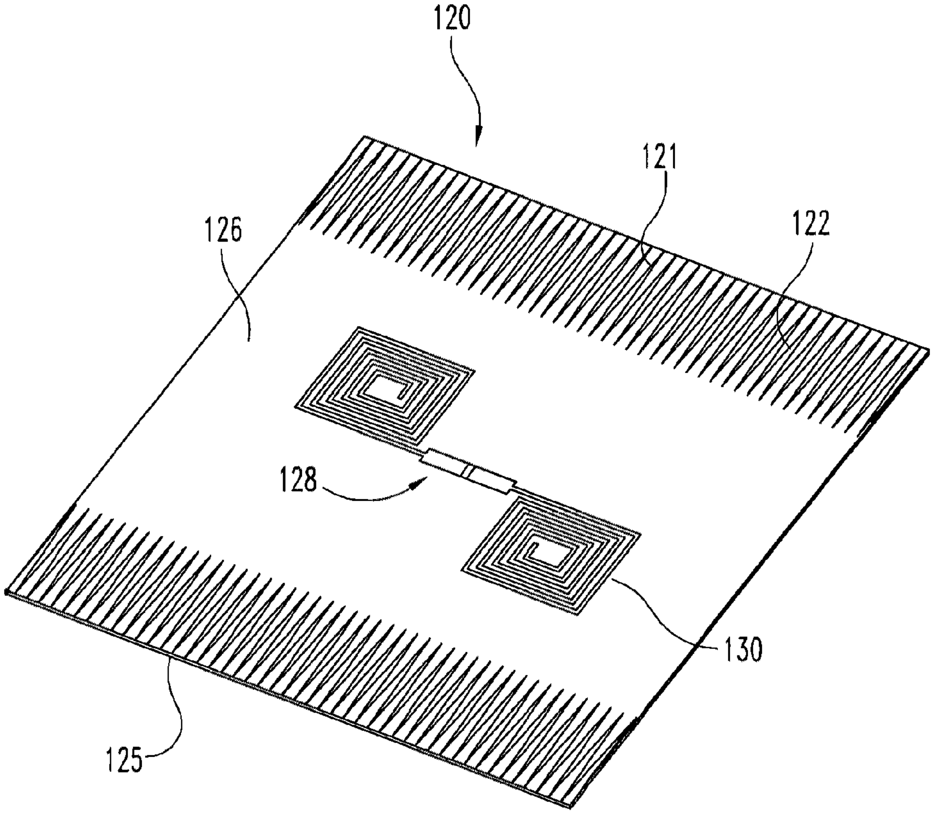

A depiction of the slot antenna 120 with an irregular geometry or edge treatment 121 and a reflecting plane 124 are shown in FIGS. 12(*a*)-(*c*). It is contemplated that the physical size of the antenna 120 is generally electrically small relative to the lowest wavelength of operation. In one embodiment, the edge treatment 121 extends along a direction parallel to a longitudinal direction of the antenna 120. A dielectric substrate 125 is located between a ground plane 126 and the reflecting plane 124. The dielectric substrate 125 may fill, in whole or in part, the spacing between the ground plane 126 and the reflecting plane 124. In one embodiment, a thickness of the dielectric substrate 125 between the ground plane 126 and the reflecting plane 124 is a relatively small portion of an operating wavelength at any frequency of operation of the antenna 120.

The antenna 120 also has a slot 128 and slotline inductors 130. The edge treatment 121 in FIGS. 12(*a*) and (*c*) includes edge serrations 122 formed on the ground plane 126. It is contemplated that the edge treatment 121 may be parallel or perpendicular to the slot 128 when the reflecting plane 124 and ground plane 126 are rectangular or in a radial configuration when the reflecting plane 124 and the ground plane 126 are circular.

In one embodiment, the slotline inductors 130 are end loaded by a meandered structure such as a spiral, which includes an n-angle spirangle, where n is three to infinity and also includes curved, circular, square, and Archimedean spirals. In another embodiment, the slot 128 has an n-fold rotational symmetry, wherein n is 2; however, n can also be any other number, including 1. In another embodiment, the slotline inductors 130 are end loaded with a meander line. Furthermore, it is contemplated that the inductors 130 may include any other suitable low-profile loading circuits. In addition, it is contemplated that the inductor 130 possesses as many turns or other geometric variations as necessary to achieve a desired load reactance at the end of the slot 128. In another embodiment, the inductor 130 may possess any shape (spiral, meander) in order to achieve a desired effective load reactance at the end of the slot 128. Further, it should be appreciated that while an inductive form of electrical reactive loading is generally contemplated, in some embodiments, the reactive loading may be capacitive in nature.

In another embodiment, an edge treatment 121 may be formed on the ground plane 126, the dielectric layer 125, and/or the reflecting plane 124.

In yet another embodiment, the height of the substrate is 0.762 mm, which is suitable for a "peel-and-stick" form factor. An adhesive material may be coupled to the ground plane 126, to the dielectric substrate 125, to the reflecting plane 124, or to any other part of the antenna 120 for coupling various components to one another.

Figure 13:
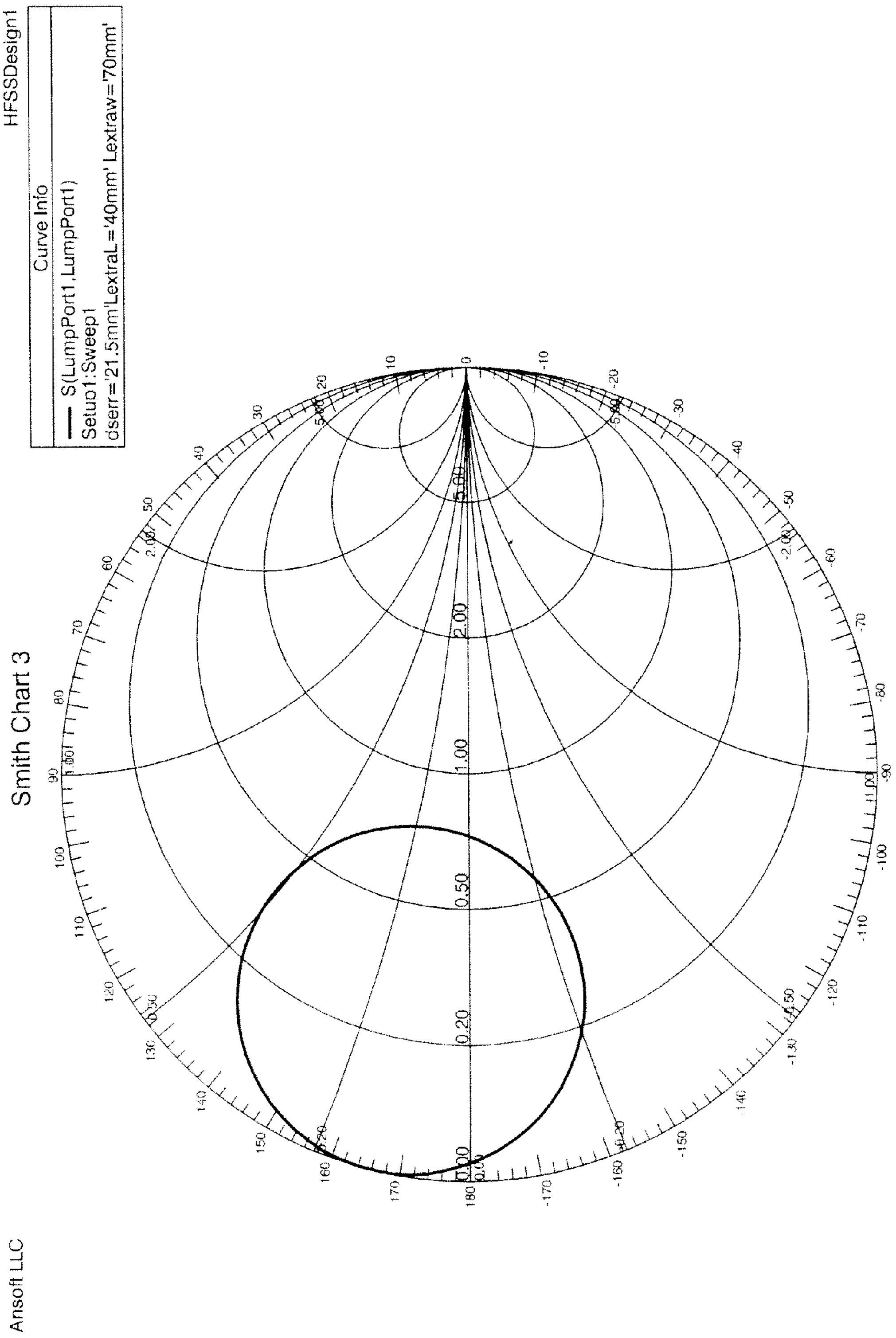
FIG. 13 is a chart describing impedance properties of a miniaturized slot antenna with edge serrations.

A chart describing the simulated impedance characteristics of the antenna is shown in FIG. 13. As can be seen in the figure, the antenna displays a near 50Ω impedance match. Although the radiation pattern is different for the slot with edge serrations than a traditional slot, these RFID antennas will likely be used in high scattering environments. Therefore, local scattering makes obtaining a pattern match to a traditional slot antenna of low importance.

An antenna suitable for a "peel-and-stick" RFID system for non-electromagnetically transparent objects was developed. A transmission line model for a rectangular slotline inductor was also developed to aid in the design of the antenna. This model is relatively accurate at low frequencies. However, at high frequencies, corner effects become important and the model no longer matches well. The slotline inductor model was incorporated into the transmission line model for the slot antenna. The transmission line model with the slotline inductor model predicted resonant frequency within 50 MHz, but the magnitude of the predicted response was incorrect. This was largely because the model assumes the slot is straight to predict the attenuation constant of the slotline. Since the effects of corners become more prominent as frequency increases, a circular inductor may be used.

A transmission line model for the circular inductor and may use this model to optimize the design of the slotline-inductor-loaded slot antenna to operate at multiple frequency bands. A transmission line model for the slotline inductor at both low and high frequencies is needed for the reproducible, and optimizable, design of the slotline inductor loaded slot antenna. A transmission line model of the circular inductor should be more accurate than that of a rectangular inductor at higher frequencies due to the lack of corners. With a transmission line model for the slotline-inductor loaded antenna, a single antenna can be designed to work at multiple frequency bands.

Figure 14:
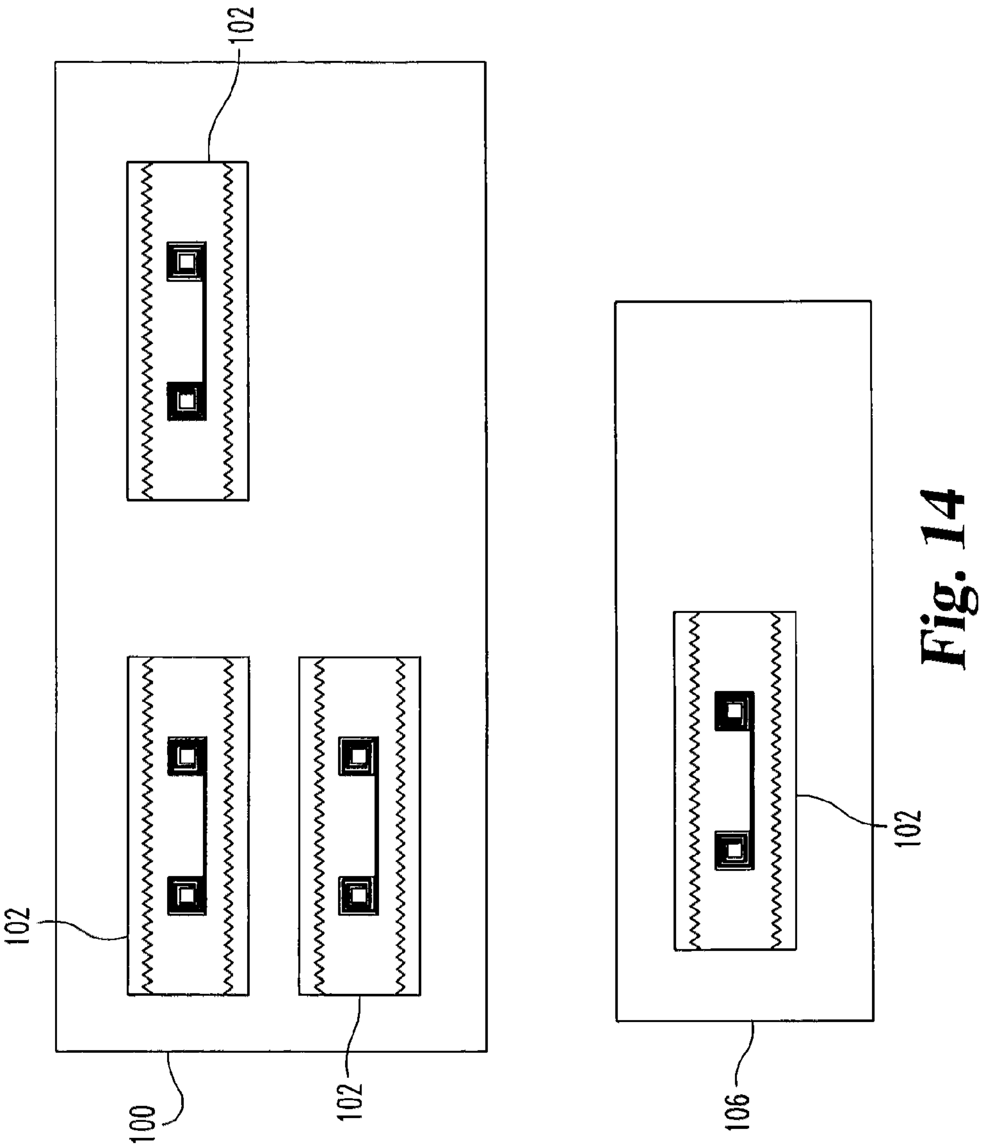
FIG. 14 is a schematic view of a sheet having a plurality of antennas and an antenna attached to an object.

FIG. 14 shows a sheet 100 including more than one antenna 102 such as the slotline antenna 120. The antennas 102 are secured to the sheet 100 with an adhesive (not shown). The antennas may be peeled off of the sheet 100 and attached to an object 106 such as a box, a metal container, a vehicle, or any other object 106 to be tracked. It is contemplated that the object be metal or any other object with various electrical properties. The antennas 102 are attached to objects 106 using an adhesive or any other attachment or securing means that would occur to those skilled in the art.

Figure 15:
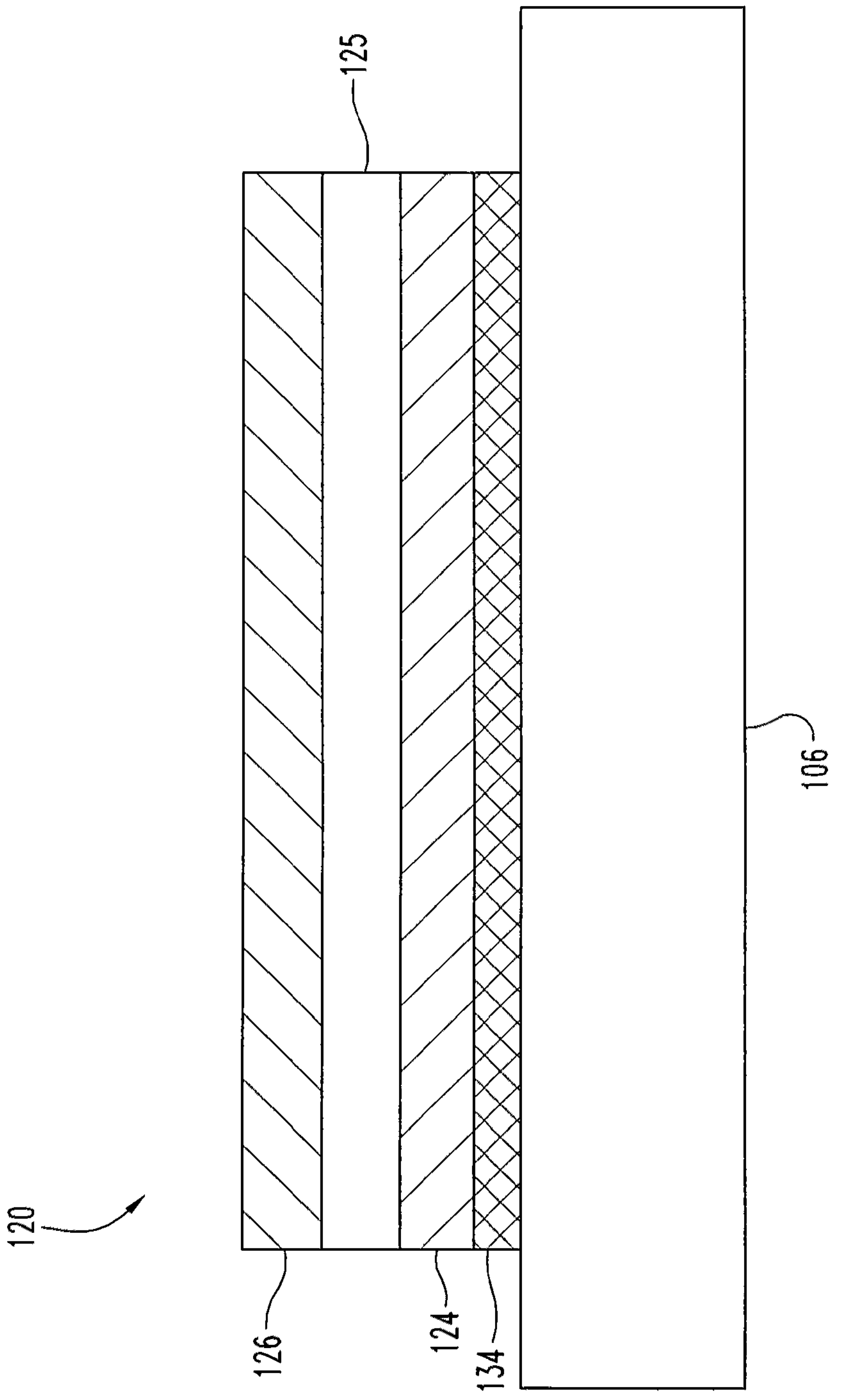
FIG. 15 is a cross-sectional view of FIG. 12(*a*).
Figure 16A:
FIG. 16(*a*) is an example of a serration or sawtooth edge treatment.
Figure 16B:
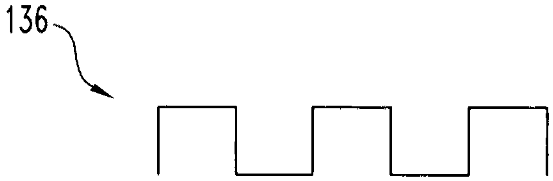
Figure 16C:
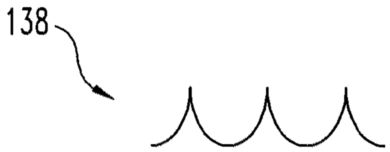
Figure 16D:
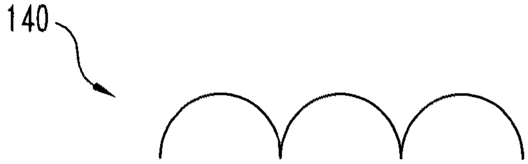

FIG. 15 shows a cross-section of the antenna of FIG. 12(*a*) in which a slot antenna 120 with a substrate 125 separating the ground plane 126 and the reflecting plate 124. An adhesive 134 may be placed on the reflecting plane 124, or some other material beneath the reflecting plane 124, such that the antenna 120 may be secured to an object 106. The components shown in FIG. 15 are not to scale.

FIGS. 16(*a*)-(*d*) show various embodiments of edge treatments 121 that may be applied to the ground plane 126. For example, edge treatments may include serrations (sometimes also referred to as sawtooth) 122 as in FIG. 16(*a*), corrugated 136 as in FIG. 16(*b*), tapered 138 as in FIG. 16(*c*), gingerbread 140 as in FIG. 16(*d*), or any other design or configuration that may be used to launch a wave from a parallel plate waveguide or parallel plate radial waveguide, including material property changes as well as conductor configuration changes. The edge treatments 121 may be a periodic or aperiodic structure with individual elements of an edge treatment being the same size or different size and where the individual elements may be the same shape or different shapes as compared to other elements.

Figure 17:
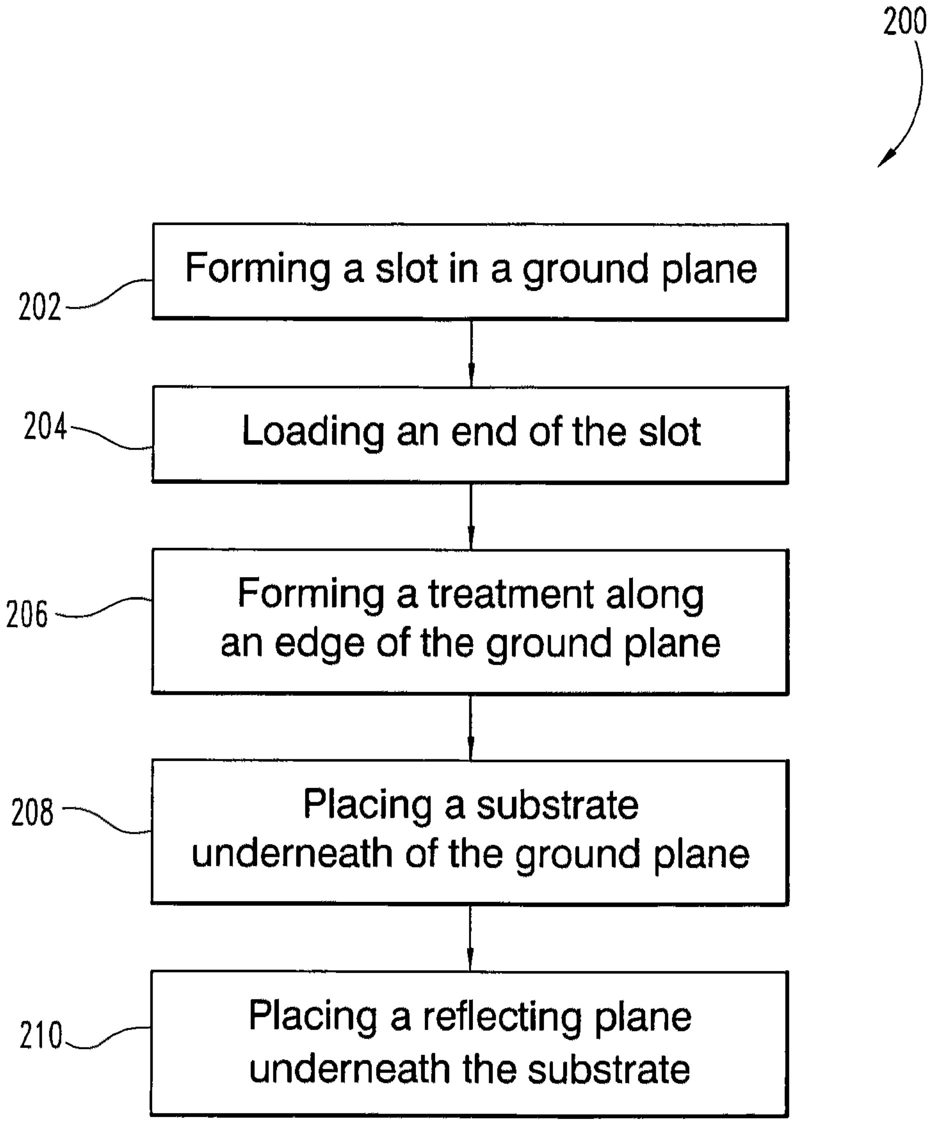
FIG. 17 is a schematic flow diagram of method of producing an antenna.

FIG. 17 shows a schematic flow diagram 200 for forming an antenna 120. Operations illustrated are understood to be exemplary only, and operations may be combined or divided, and added or removed, as well as re-ordered in whole or in part, unless explicitly stated to the contrary. Operation 202 includes forming a slot 128 in a ground plane 126 by cutting, stamping out, or using any other technique known to those skilled in the art. Operation 204 includes loading ends of the slot 128 to form spiraled slotline inductors or other similar low-profile loading elements 130 by cutting, stamping out, or using any other technique known to those skilled in the art. Operation 206 includes forming a treatment 121 along at least one edge of the ground plane 126 by cutting, stamping out, or using any other technique known to those skilled in the art. Operation 208 includes placing a dielectric substrate 125 underneath of the ground plane 126. Operation 210 includes placing a reflecting plane 124 underneath the substrate 125.

Figure 18:
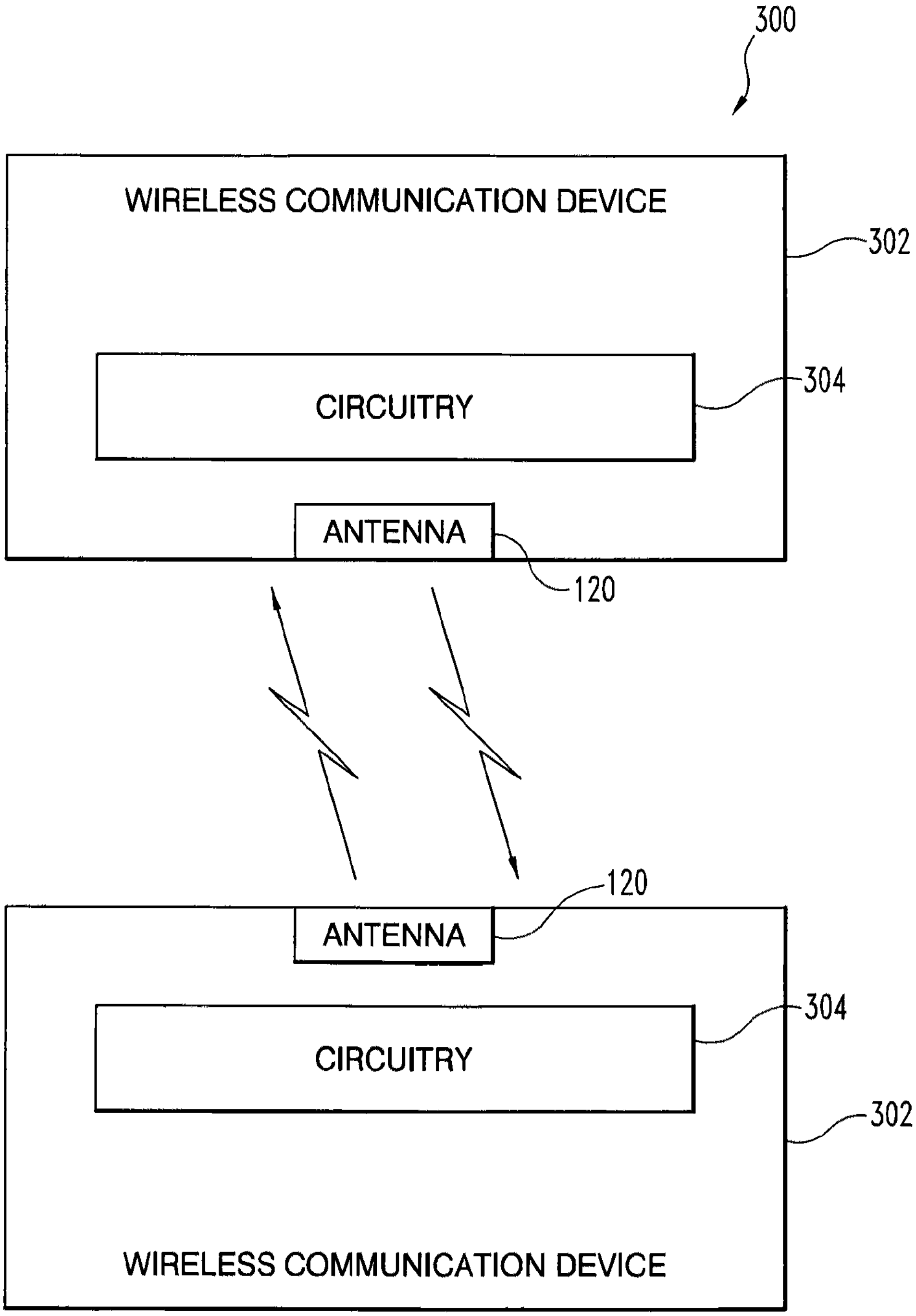
FIG. 18 is a schematic diagram of a system using an antenna of the present application.

FIG. 18 illustrates wireless communication device system 300 of another embodiment of the present application. System 300 depicts two wireless communication devices 302. Devices 302 can be of any type, including but not limited to a computer with wireless networking, a mobile telephone, a RFID reader, a RFID tag on an object, a wireless Personal Digital Assistant (PDA), a video display device, and/or an audio device, just to name a few examples. Devices 302 each include components, programming, and circuitry suitable to its particular application (not shown), and also include communication circuitry 304 operatively coupled to antenna 120. Devices 302 are arranged to perform bidirectional communications with antennas 120; however, in other embodiments one or more of devices 302 may communicate in one direction only (unidirectionally).

Circuitry 304 may be configured to provide appropriate signal conditioning to transmit and receive desired information (data), and correspondingly may include filters, amplifiers, limiters, modulators, demodulators, CODECs, digital signal processing, and/or different circuitry or functional components as would occur to those skilled in the art to perform the desired communications. In addition, circuitry 304 may be adapted to control various configurations that can be provided with antenna 120.

In one nonlimiting form, circuitry 304 includes processing to store or process information, modulating or demodulating a radio-frequency (RF) signal, or the like, or a combination thereof. The information may include identification information, status information, or any other type of information that would occur those skilled in the art. In one embodiment, the information is included in a signal transmitted by the antenna 120 in response to electromagnetic radiation. In another embodiment, the circuitry may automatically determine and select a suitable antenna configuration and to automatically change configurations in response to degradation of communication conditions or the like. Nonetheless, in other forms, reconfiguration may additionally or alternatively be performed manually or use such other techniques as would occur to those skilled in the art. Also, it should be appreciated that while only one antenna 120 is depicted for each of devices 302, multiple antennas 120 can be utilized.

Figure 19:
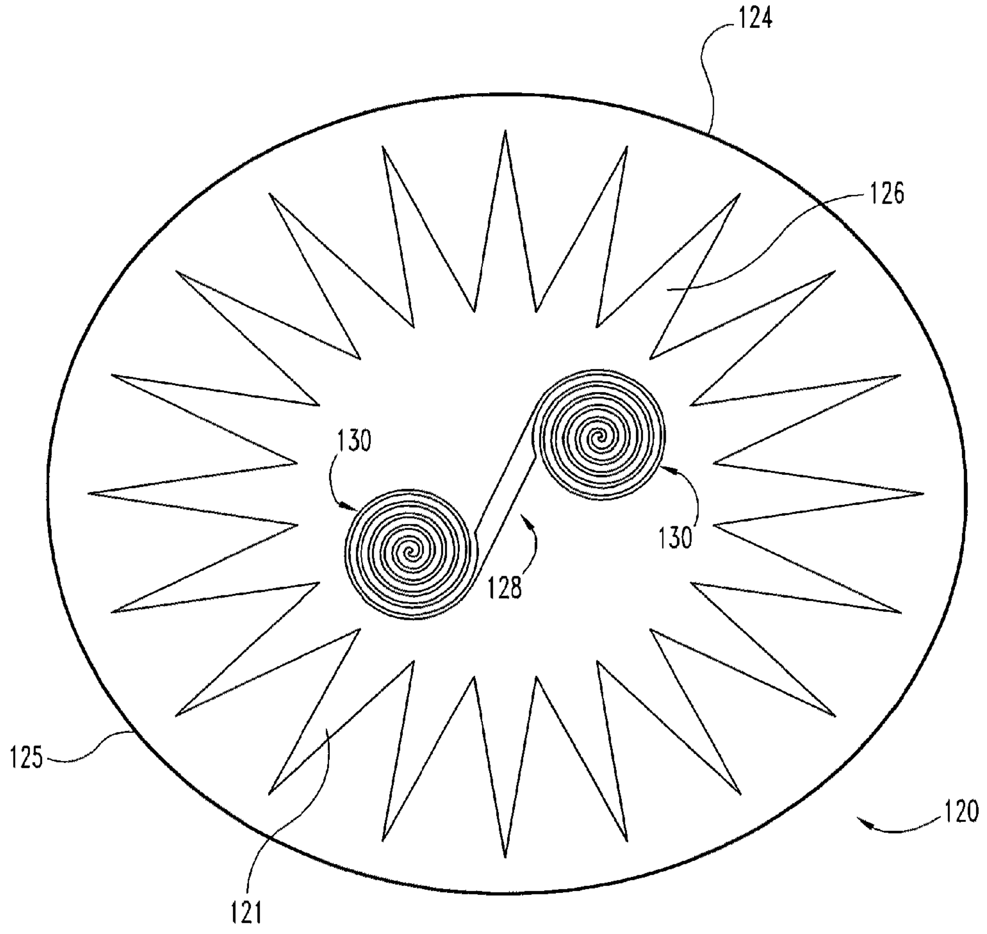
FIG. 19 is another embodiment of an antenna having a radial edge treatment and a circular ground and reflecting plane.

FIG. 19 illustrates another embodiment of the antenna 120 in which the ground plane 126, dielectric layer 125, and reflecting plane 124 are circular and the edge treatment 121 is radial. Furthermore, the antenna 120 may include a slot 128 and one more inductors 130.

Figure 20:
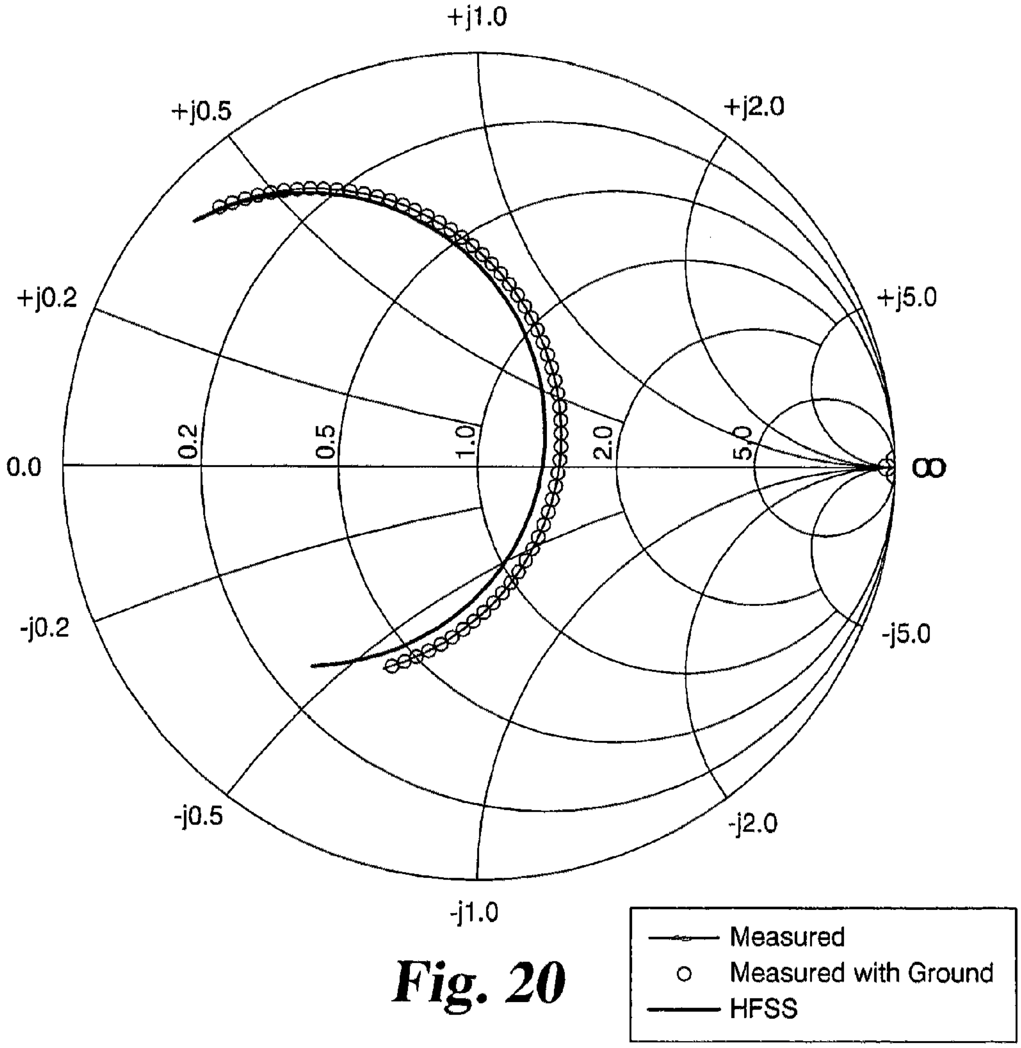
FIG. 20 is an exemplary Smith Chart describing the simulated and measured impedance properties of one embodiment of the antenna.
Figure 21:
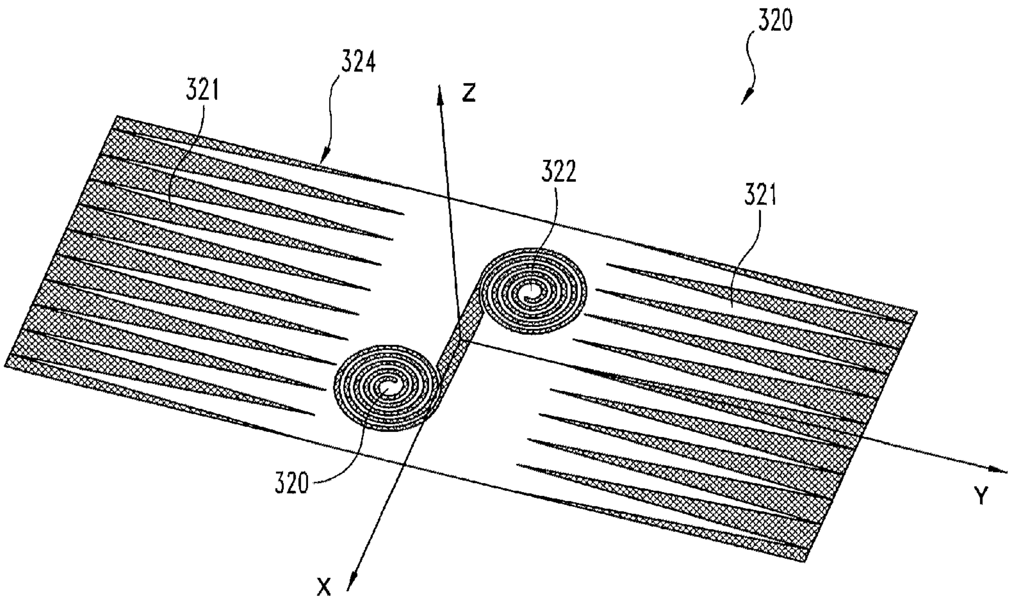
FIG. 21 is another embodiment of an antenna using an edge treatment parallel to the slot of the antenna and a rectangular ground and reflecting plane.

FIG. 20 is an exemplary Smith Chart showing the measured and simulated impedance characteristics of one embodiment of the antenna 320 (as illustrated in FIG. 21). The measured characteristics display the placement insensitivity of the antenna 120. The impedance characteristics were measured with and without a backing ground plane placed behind the reflecting plane of the antenna. As can be seen in the figure, the impedance is placement insensitive.

FIG. 21 illustrates another embodiment of the present application with an antenna 320 including an edge treatment 321, inductors 322, and reflecting plane 324. As seen in FIG. 21, the inductors 322 may be circular in shape and include as many turns as necessary to achieve the desired effective load reactance at the end of the slot.

In another embodiment of the present application, an apparatus includes a ground plane having a slot defined therein, the slot defining an antenna element and a first inductor disposed at a first end of the antenna element; and a treatment formed in an edge of the ground plane.

The embodiment may include one or more of the following features: a perimeter of the slot is surrounded by the ground plane; the treatment is formed in more than one edge of the ground plane; the first inductor is spiral-shaped; the first inductor is a three-turn inductor; the antenna element is approximately one-tenth of a wavelength long; a shape of the treatment includes at least one of serrated, corrugated, tapered, and gingerbread; the slot defines a second inductor disposed at a second end of the antenna element; the slot has an n-fold rotational symmetry, wherein n is 2; a dielectric body adjacent to the ground plane; the dielectric body has a thickness of about 0.002 wavelengths; a reflecting plane spaced apart from the ground plane; an adhesive material coupled to the reflecting plane, the adhesive material configured to adhere the apparatus to an object; the object is metal; circuitry electrically connected to the antenna element; the first inductor and second inductor are structured to allow the apparatus to operate at more than one frequency.

In yet another embodiment, a method for forming an antenna includes forming a slot in a ground plane, loading ends of the slot to form spiraled slotline inductors; and forming a treatment along at least one edge of the ground plane.

The embodiment may include one or more of the following features: placing a dielectric substrate underneath of the ground plane; placing a reflecting plane underneath the substrate.

In another embodiment, an apparatus includes a sheet, which includes more than one antenna, wherein each antenna includes at least one slotline inductor that is spiraled and each antenna includes a treatment along at least one edge of the ground plane, and wherein each antenna is secured to the sheet with an adhesive. The embodiment may include the following feature: each antenna includes means for securing the antenna to an object.

In yet another embodiment, an apparatus including a radio-frequency identification (RFID) tag defined by a stack of several layers including a first layer of electrically conductive material having a slot to form a slot antenna, a second layer of non-electrically conductive material, and a third layer of electrically conductive material to form a reflective plane; the slot is structured to transmit a signal in response to electromagnetic radiation; inductors are formed at ends of the slot; the inductors are spiral-shaped; and a treatment at an edge of the first layer.

The embodiment may include one or more of the following features: an adhesive material coupled to an exterior surface of the RFID tag, wherein the adhesive material is configured to adhere the RFID tag to a metal object; the signal includes at least one of identification information and status information; circuitry structured to generate the at least one of identification information and status information in response to the electromagnetic radiation received by the slot antenna.

Still another embodiment is directed to an apparatus, comprising: a dielectric layer; an electrical ground layer carried on the dielectric layer, the ground layer defining a slot therein, the slot providing an antenna element; an electrically reactive load element disposed at an end portion of the antenna element; and an edge of the ground layer being shaped to selectively expose a portion of the dielectric layer to transmit electromagnetic radiation therefrom.

Yet another embodiment is directed to a method, including: providing an antenna device including a dielectric carrying an electrical ground layer; in the ground layer, defining a slot antenna with an electrically reactive load along at least one end portion thereof; and forming an edge of the ground layer to selectively expose the dielectric to transmit an electromagnetic radiation signal therefrom.

In a further embodiment, an apparatus includes: an electrically conductive layer; a dielectric; an electrical ground layer positioned on the dielectric opposite the electrically conductive layer, the ground layer defining a slot antenna; an electrically reactive load element positioned at an end portion of the slot antenna; and an edge of at least one of the electrically conductive layer and the ground layer being formed with a pattern to selectively expose a portion of the dielectric to transmit electromagnetic radiation reflected by the electrically conductive layer.

Yet a further embodiment is directed to an apparatus, comprising: electric circuitry to wirelessly communicate information; an antenna device operatively coupled to the electric circuitry, including: an electrically conductive ground layer defining a slot antenna with a reactive load element disposed at one end portion thereof; and an edge of the ground layer being structured with an uneven pattern to selectively provide electromagnetic radiation from the antenna device to transmit the information.

Another embodiment is directed to a method, comprising: providing a dielectric with an electrical ground layer positioned thereon, the ground layer defining a slot antenna with one or more electrically reactive loads therealong; positioning the dielectric on an electrically conductive material opposite the ground layer; and defining a dentate pattern along an edge of at least one of the ground layer and the electrically conductive material to selectively expose the dielectric to transmit electromagnetic radiation therefrom.

While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the inventions as defined herein are desired to be protected.

What is claimed is:

1. An apparatus, comprising:

a dielectric layer;

an electrical ground layer carried on the dielectric layer, the ground layer defining a slot therein, the slot providing an antenna element;

an electrically reactive load element disposed at an end portion of the antenna element;

an edge of the ground layer being shaped to selectively expose a portion of the dielectric layer to transmit electromagnetic radiation therefrom, wherein the edge includes a repeated pattern; and an electrically conductive layer positioned on the dielectric layer opposite the ground layer to launch at least a portion of the electromagnetic radiation through the portion of the dielectric layer in a parallel-plate waveguide mode, wherein the electrically conductive layer is not electrically connected to the ground layer.

2. The apparatus of claim 1, wherein the electrically reactive load element is an inductor.

3. The apparatus of claim 2, wherein the electrically reactive load element includes a spiral shape.

4. The apparatus of claim 2, wherein the electrically reactive load element includes a meander line.

5. The apparatus of claim 1, further comprising another reactive load element positioned at another end portion of the antenna element.

6. The apparatus of claim 1, wherein at least one of the edge and the portion of the dielectric layer defines a dentate pattern.

7. The apparatus of claim 1, wherein the edge includes the repeated pattern corresponding to at least one of a: serriform, corrugation, taper, and gingerbread.

8. The apparatus of claim 1, further comprising:

electric circuitry operatively coupled to the ground layer and the electrically conductive layer and including means for providing RFID information in the electromagnetic radiation.

9. A method, comprising:

providing an antenna device including a dielectric carrying an electrical ground layer;

in the ground layer, defining a slot antenna with an electrically reactive load along at least one end portion thereof; and forming an edge of the ground layer to selectively expose the dielectric to transmit an electromagnetic radiation signal therefrom, wherein the edge includes a repeated pattern; and attaching an electrically conductive layer to the dielectric opposite the ground layer to reflect at least a portion of the electromagnetic radiation signal through the dielectric in a parallel-plate waveguide mode, wherein the electrically conductive layer is not electrically connected to the ground layer.

10. The method of claim 9, which includes:

attaching the electrically conductive layer to an electrically conductive object, the ground layer being positioned opposite the object; and after the attaching of the electrically conductive layer, operating the antenna device to provide RFID tag information for the object.

11. The method of claim 9, wherein the reactive load is inductive.

12. The method of claim 11, which includes forming the reactive load with a spiral defined by the ground layer.

13. The method of claim 9, which includes forming the antenna device as one of a plurality of antenna devices on a sheet including an adhesive side.

14. The method of claim 9, which includes forming the antenna device with another reactive load along another end portion of the slot antenna.

15. The method of claim 9, wherein the forming of the edge defines the repeating pattern corresponding to at least one of a: serriform, corrugation, and scalloping

16. The method of claim 15, wherein the reactive load is inductive and includes a spiral shape defined by the ground layer.

17. The method of claim 9, which includes:

sizing the slot antenna and a repeated shape pattern of the edge to operate the antenna device a multiple frequencies; and sizing the antenna device to be electrically small relative to lowest operating wavelength.

18. An apparatus, comprising:

electric circuitry to wirelessly communicate information;

an antenna device operatively coupled to the electric circuitry, including:

an electrically conductive ground layer defining a slot antenna with a reactive load element disposed at one end portion thereof; and an edge of the ground layer being structured with an uneven pattern to selectively provide electromagnetic radiation from the antenna device to transmit the information; and an electrically conductive material positioned opposite the ground layer to launch at least a portion of the electromagnetic radiation through a dielectric layer that is located between the ground layer and the electrically conductive material in a parallel-plate waveguide mode, wherein the electrically conductive material is not electrically connected to the ground layer.

19. The apparatus of claim 18, wherein the circuitry includes means for operating as an RFID tag.

20. The apparatus of claim 18, wherein the uneven pattern corresponds to at least one of a: serriform, corrugation, sawtooth, and scalloping.

21. The apparatus of claim 19, wherein the reactive load element is inductive.

22. The apparatus of claim 21, further comprising another reactive load element that is inductive.

* * * * *